(12) United States Patent
Nakano

(10) Patent No.: US 7,082,548 B2
(45) Date of Patent: Jul. 25, 2006

(54) BACKUP SYSTEM AND DUPLICATING APPARATUS

(75) Inventor: Manabu Nakano, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 510 days.

(21) Appl. No.: 09/793,539

(22) Filed: Feb. 27, 2001

(65) Prior Publication Data

US 2002/0040449 A1    Apr. 4, 2002

(30) Foreign Application Priority Data

Oct. 3, 2000    (JP)    ............................... 2000-303088

(51) Int. Cl.
G06F 11/00    (2006.01)
(52) U.S. Cl. ........................... 714/6; 714/819; 711/162; 707/202; 707/204
(58) Field of Classification Search .................... 714/6, 714/719, 819; 711/162; 707/204
See application file for complete search history.

(56) References Cited

U.S. PATENT DOCUMENTS

| | | | | |
|---|---|---|---|---|
| 3,311,890 A | * | 3/1967 | Waaben | 714/719 |
| 4,450,559 A | * | 5/1984 | Bond et al. | 714/6 |
| 5,155,845 A | * | 10/1992 | Beal et al. | 714/6 |
| 5,590,279 A | * | 12/1996 | Kawabata et al. | 714/53 |
| 5,592,618 A | * | 1/1997 | Micka et al. | 714/54 |
| 5,708,771 A | * | 1/1998 | Brant et al. | 714/22 |
| 5,740,397 A | * | 4/1998 | Levy | 711/114 |
| 5,887,270 A | * | 3/1999 | Brant et al. | 711/162 |
| 5,941,998 A | * | 8/1999 | Tillson | 714/54 |
| 5,949,970 A | * | 9/1999 | Sipple et al. | 714/15 |
| 6,304,980 B1 | * | 10/2001 | Beardsley et al. | 714/6 |
| 6,353,878 B1 | * | 3/2002 | Dunham | 711/162 |
| 6,549,921 B1 | * | 4/2003 | Ofek | 707/204 |
| 6,571,350 B1 | * | 5/2003 | Kurokawa et al. | 714/6 |
| 6,591,351 B1 | * | 7/2003 | Urabe et al. | 711/162 |
| 6,601,187 B1 | * | 7/2003 | Sicola et al. | 714/6 |
| 6,643,795 B1 | * | 11/2003 | Sicola et al. | 714/6 |
| 6,658,592 B1 | * | 12/2003 | Cohen et al. | 714/6 |
| 6,813,688 B1 | * | 11/2004 | Wu et al. | 711/114 |
| 2001/0004754 A1 | * | 6/2001 | Murayama | 711/114 |
| 2003/0061456 A1 | * | 3/2003 | Ofek et al. | 711/162 |

* cited by examiner

Primary Examiner—Robert Beausoliel
Assistant Examiner—Marc Duncan
(74) Attorney, Agent, or Firm—Staas & Halsey LLP

(57) ABSTRACT

A backup system which can improve reliability of data without sacrificing availability of a data processing system and a duplicating apparatus employed in the backup system. The backup system includes a duplicating apparatus for taking in data in the transfer of the data and codes from a host apparatus to a storage apparatus and holding the data as duplicated data, the duplicating apparatus including a code fetching unit to fetch the codes and hold the fetched codes as duplicated codes, and a data verifying unit to verify existence or nonexistence of an error in the data by comparing the taken data and the duplicated data.

25 Claims, 9 Drawing Sheets

THE PRINCIPLE OF A BACKUP SYSTEM OF THE PRESENT INVENTION

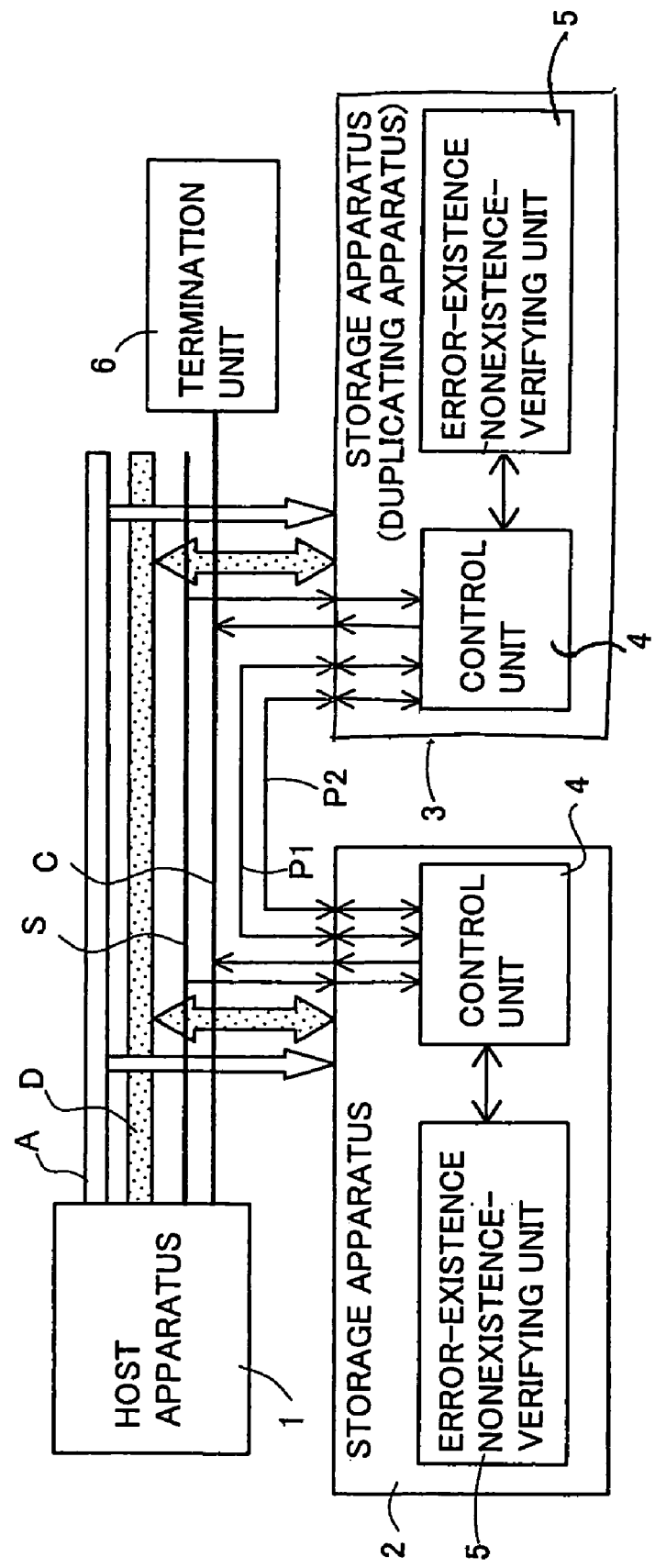
FIG. 1 THE PRINCIPLE OF A BACKUP SYSTEM OF THE PRESENT INVENTION

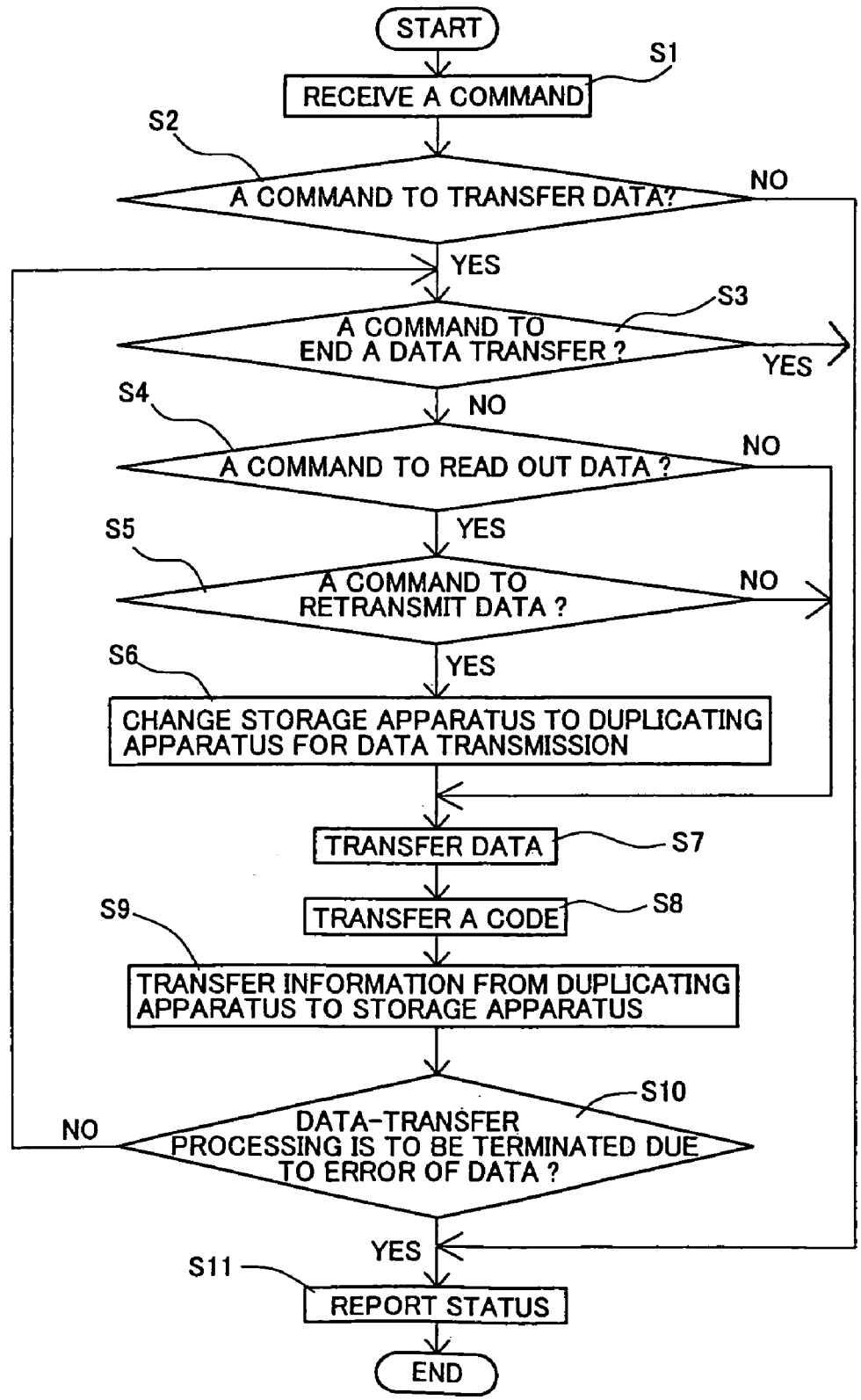

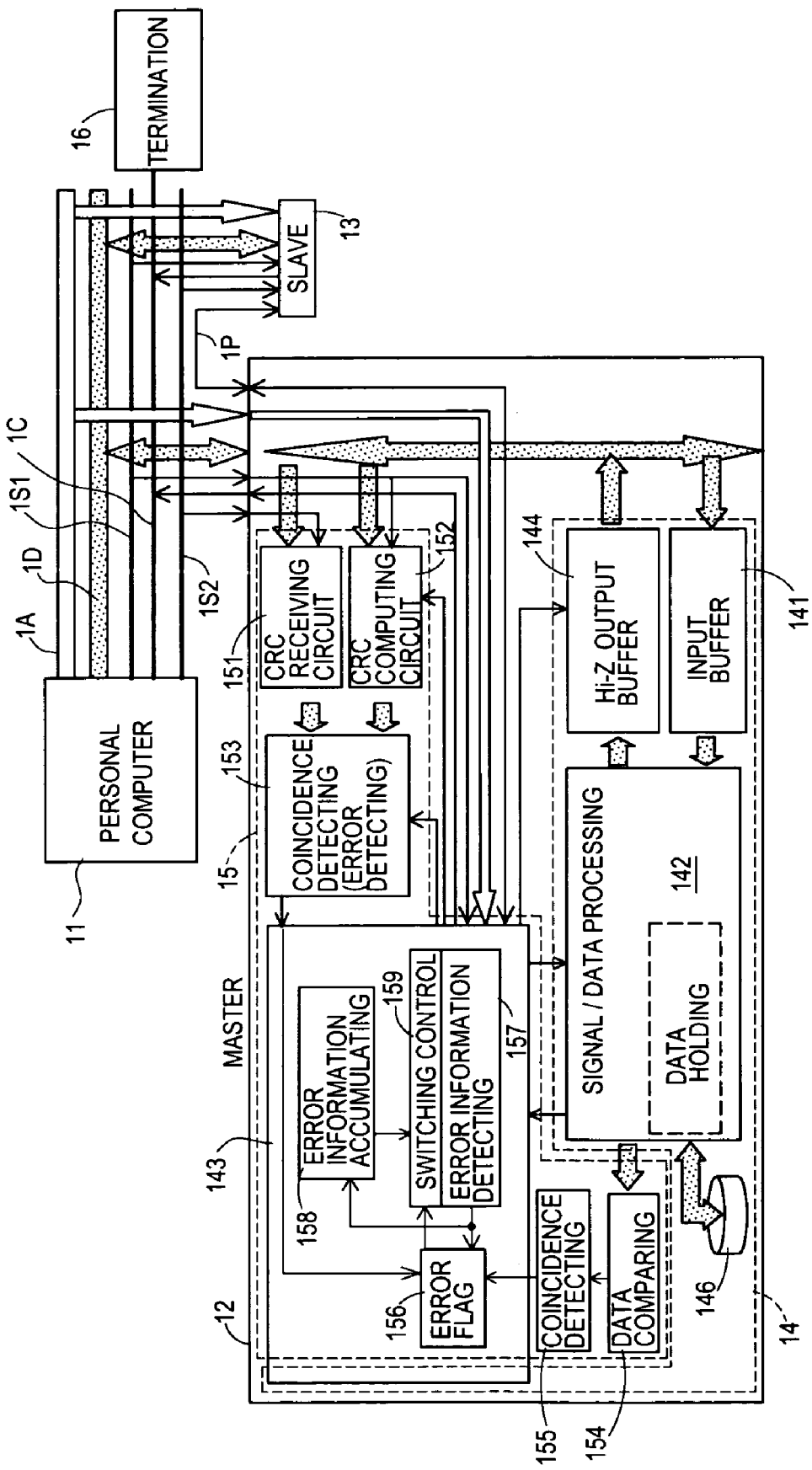

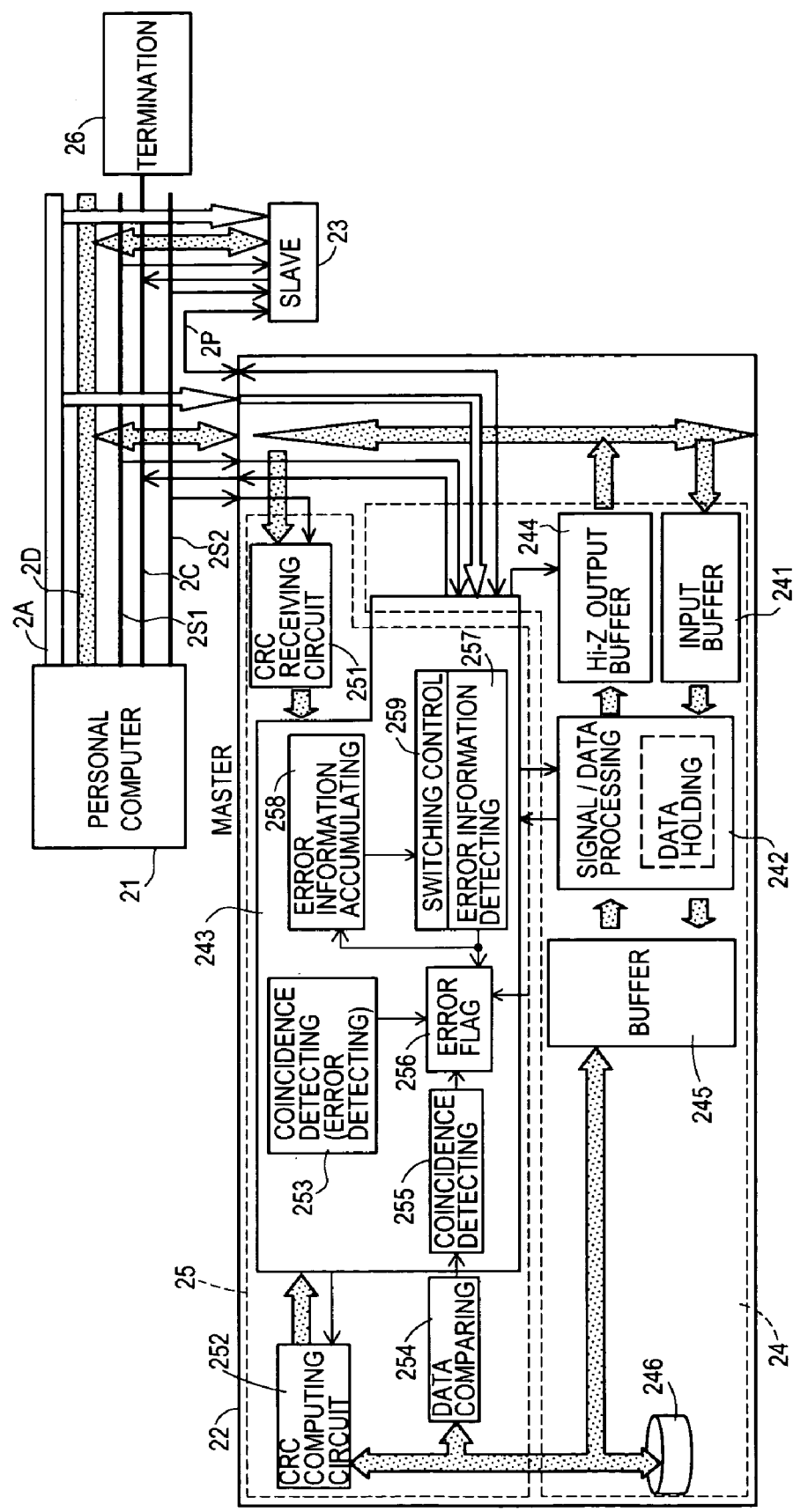
FIG. 4 CONFIGURATION OF A BACKUP SYSTEM IN SECOND EMBODIMENT

FIG. 5 CONFIGURATION OF A BACKUP SYSTEM IN THIRD EMBODIMENT
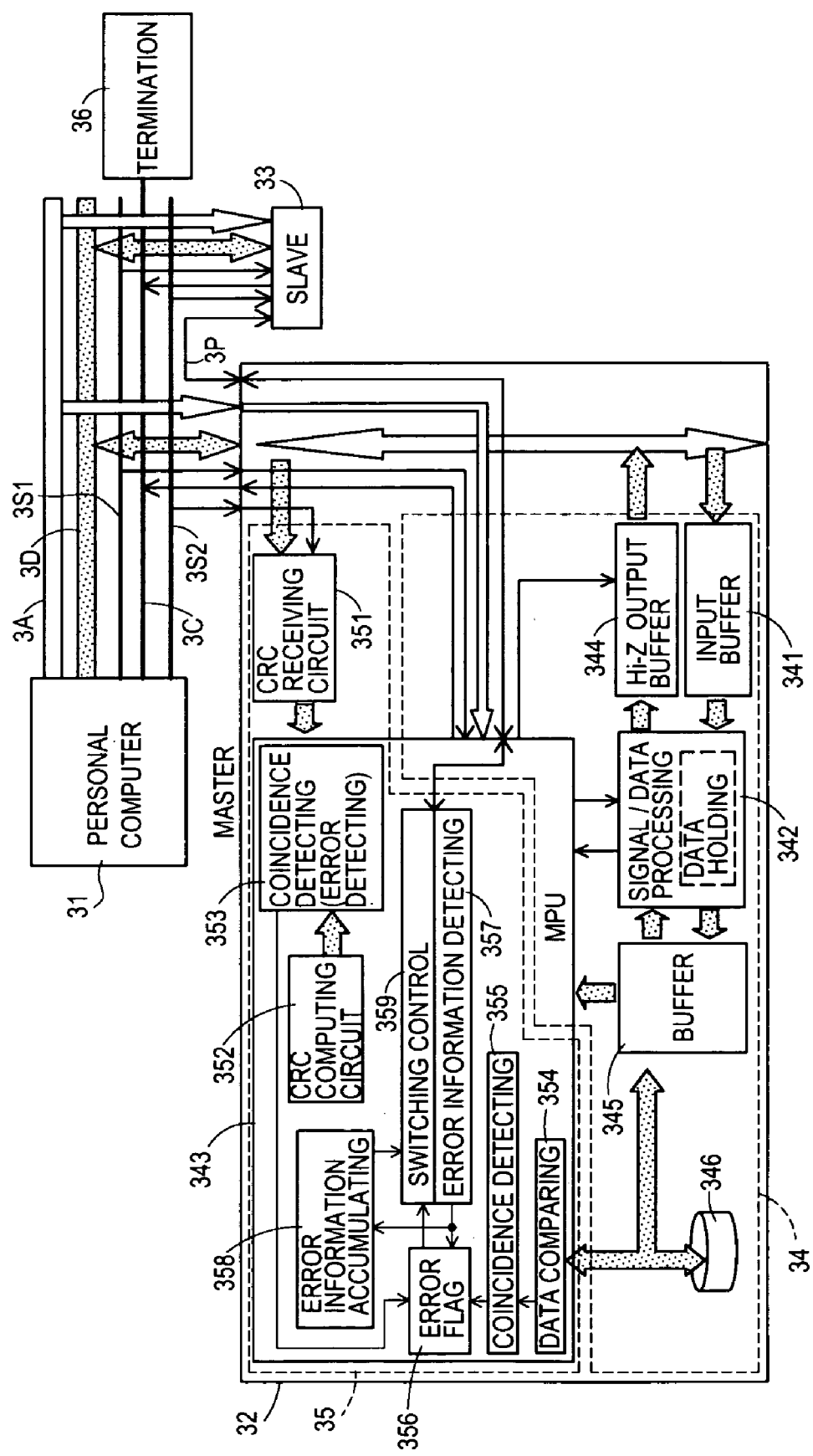

FIG. 6    TYPICAL CIRCUIT OF A TERMINATION UNIT
(a) PULL-UP RESISTOR CIRCUIT
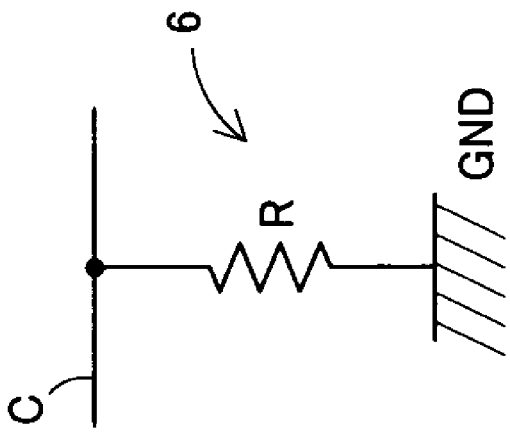
(b) PULL-DOWN RESISTOR CIRCUIT
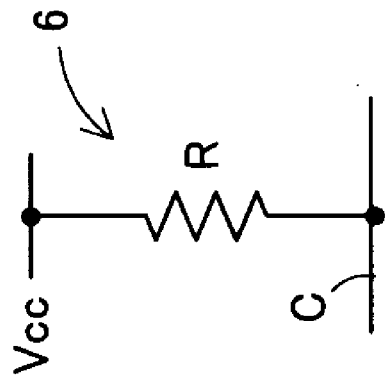

CONTROL FLOWS OF A FIRST APPLICATION EXAMPLE OF FIRST TO FOURTH EMBODIMENTS

CONTROL FLOWS OF A SECOND APPLICATION EXAMPLE OF FIRST TO FOURTH EMBODIMENTS

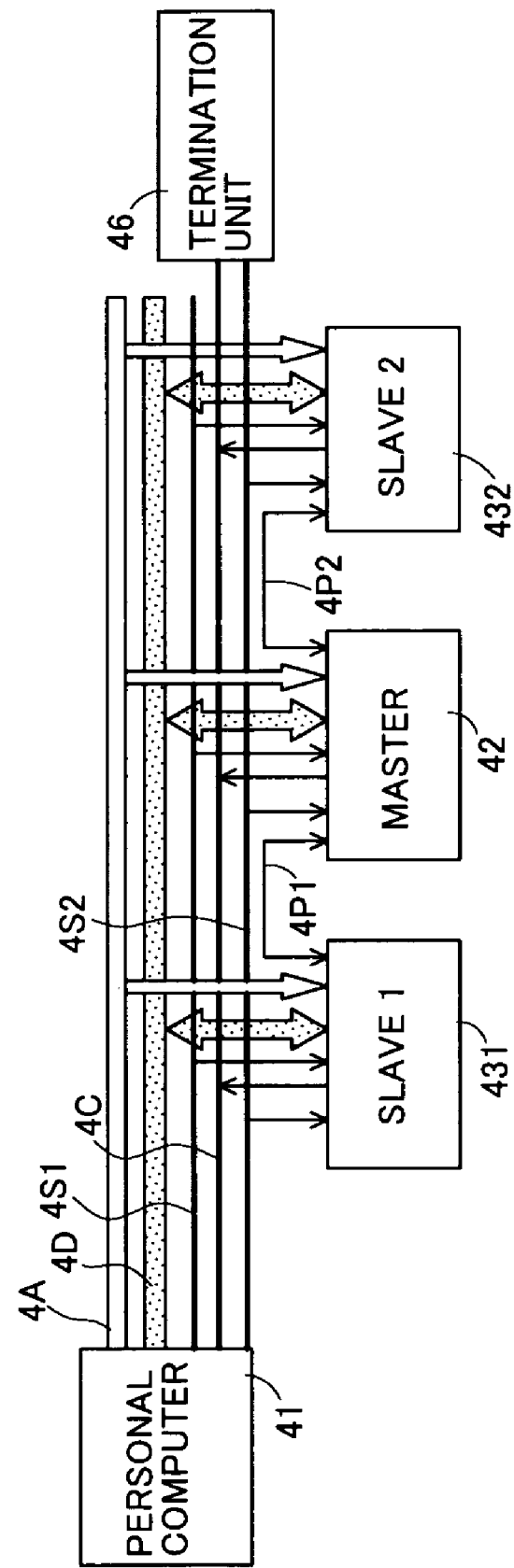
FIG. 9 CONFIGURATION OF A BACKUP SYSTEM IN FOURTH EMBODIMENT

BACKUP SYSTEM AND DUPLICATING APPARATUS

BACKGROUND OF THE INVENTION

1. Field of the Invention

The present invention relates to a data backup system and a data duplicating apparatus employed in the backup system used in a variety of data processing systems. More particularly, the present invention relates to a data backup system and a data duplicating apparatus employed in a data backup system that can be used for making a backup of data without sacrificing availability of the data processing system adopting the backup system.

2. Related Art

Traditionally, in order to raise the reliability of data in a variety of data processing systems, there is adopted a double-storage configuration in which the data is stored in a storage device of the system and a duplicate of the data is stored in a backup device. The backup device monitors commands issued by a host apparatus to the storage device. When a transfer of data from the host apparatus to the storage device is detected, data being stored into the storage device is also taken in by the backup device. In this way, a time it takes to make a backup of data being stored is concealed in a time it takes to store the data into the storage device. As a result, the availability of the data processing system is improved. In addition, even though the access speed of the backup device is not so high as that of the storage device in many cases, by providing the backup storage with a high-speed buffer area such as a cache memory in such a case, the difference in access speed between the backup device and the storage device can be absorbed so that it is possible to make operations of the backup device keep up with transfers of data in the data processing system.

Take a RAID system, which has been becoming popular, as an example. The RAID system is a system provided with a plurality of low-cost disc drives and intended for further improving a high-speed response characteristic and redundancy or reliability of data.

In particular, a RAID1 system is a system for improving redundancy or reliability of data. The RAID1 system adopts the so-called disc mirroring technique whereby data is stored in a pair of disc drives. Specifically, the data is stored in a data storage disc drive while a duplicate of the data is stored in a backup disc drive. In a data write operation, data is stored in both the disc drives at the same time. Thus, the host apparatus carries out an operation to write data into the pair of disc drives in the same way as the ordinary operation to store data without being aware of the fact that the backup disc drive is used as a redundant disc drive. In a data read operation, on the other hand, an access can be made to any individually selected disc drive. Thus, if one of the disc drive in the pair is out of order, the access can be switched to the other disc drive, thereby a normal data read operation can be carried out in a system implementing data redundancy or data reliability.

However, the host apparatus does not receive any response from the backup disc drive except a report such as a result of a self diagnosis carried out by each of the disc drives at a system build-up time in spite of the fact that, when the host apparatus writes data into the data storage disc drive controlled by the host apparatus, the data is also written into the backup disc drive at the same time without the need for the host apparatus to be aware of the fact that one of disc drives in the pair is a duplicate of the other. In order to verify that data has been correctly written into the disc drive recognized as the storage device, processing such as detection or correction of an error is carried out in the course of a normal data write operation. On the other hand, there is no verification unit for verifying that data has been correctly stored at the same time into the backup disc drive during the data write operation. There is raised a problem of inability to assure reliability of data written into the backup disc drive.

For the reason described above, in order to assure reliability of data written into the backup disc drive, it is necessary for the host apparatus to execute a procedure to read out data back from the backup disc drive. Even though the availability of the data processing system is improved by virtue of writing of data into both the disc drives at the same time in a data write operation, in order to assure reliability of data written into the backup disc drive, it is necessary to read out the data back after writing it in order to verify that the data has been written correctly. There is raised a problem of worsened availability of the data processing system.

In addition, it is generally flows of data transfers between the host apparatus and the data storage disc drive that are controlled. That is, such control of flows is not applied to the backup disc drive, which has an access speed lower than the data storage disc drive. By setting a configuration to provide the backup storage with a high-speed buffer area such as a cache memory, however, the difference in access speed between the backup device and the storage device can be absorbed. Nevertheless, since the buffering performance is determined by the size of the buffer area, in an operation to write data with an amount exceeding the size of the buffer area, the buffer area cannot accommodate the data, raising a problem of a data overflow or a problem of a data underflow in the case of a read operation. In order to solve the problems such as a data overflow and a data underflow, it is necessary to allocate a buffer area of a large size. However, such a buffer area causes another problem of an increased number of components composing the backup disc drive and a large number of such components gives rise to another problem of a rising cost.

SUMMARY OF THE INVENTION

It is thus an object of the present invention to solve the above problems, by providing a backup system adopted by a data processing system and a duplicating apparatus employed in the backup system that can be used for making a backup of data without sacrificing availability of the data processing system.

In order to achieve the object described above, according to one aspect of the invention, an inventive backup system includes a duplicating apparatus for taking in data in the transfer of the data and codes from a host apparatus to a storage apparatus and holding the data as duplicated data, wherein the duplicating apparatus comprises a code fetching unit and a data verifying unit. Further, an inventive duplicating apparatus for taking in data in the transfer of the data and codes from a host apparatus to a storage apparatus and holding the data as duplicated data comprises a code fetching unit and a data verifying unit.

The code fetching unit employed in the backup system or the duplicating apparatus takes in data transferred from the host apparatus to the storage apparatus as well as codes at the same time as the storage apparatus, and the data verifying unit verifies that no error is generated in the data and the codes duplicated to the duplicating apparatus.

In this way, in a transfer of data from the host apparatus to the storage apparatus, the data is taken in by the duplicating apparatus at the same time as the storage apparatus. In addition, codes are also taken in at the same time as well. The data taken in by the duplicating apparatus is stored therein as duplicated data. Furthermore, existence of an error can be checked based on the duplicated data and the duplicated codes. That is, the duplicating apparatus can check existence of an error in the duplicated data based on the duplicated code. As a result, reliability of duplicated data stored in the duplicating apparatus is improved, making it possible to assure high reliability of data in the backup system.

In addition, since it is not necessary to transfer the duplicated data itself from the duplicating apparatus back to the host apparatus for a verification purpose, the availability of the data processing system is also improved as well.

In accordance with another aspect of the invention, an inventive backup system includes a duplicating apparatus for taking in data in the transfer of the data and codes from a host apparatus to a storage apparatus and holding the data as duplicated data, wherein the duplicating apparatus comprises a fetching unit for taking in the data or codes in a transfer of the data and the codes and from the storage apparatus to the host apparatus and at least one of the following units: a data comparing unit; and a data verifying unit. Further, an inventive duplicating apparatus for taking in data in the transfer of the data and codes from a host apparatus to a storage apparatus and holding the data as duplicated data comprises a fetching unit for taking the data and codes in a transfer of the data and the codes from the storage apparatus to the host apparatus and at least one of the following units: a data comparing unit; and a data comparing unit.

The fetching unit employed in the duplicating apparatus of the backup system takes in data transferred from the storage apparatus to the host apparatus along with codes at the same time as the host apparatus, and the data comparing unit compares the data taken in by the fetching unit with duplicated data. As an alternative, the data verifying unit verifies that no error exists in the duplicated data based on the codes taken in by the fetching unit.

In this way, in a transfer of data and codes from the storage apparatus to the host apparatus, the data or the codes is fetched also by the duplicating apparatus, which is then capable of comparing the fetched data with duplicated data or determining existence of an error based on the fetched codes and the duplicated data. Thus, it is possible to improve reliability of data transferred from the storage apparatus to the host apparatus.

In addition, data stored in the storage apparatus can be compared with duplicated data stored in the duplicating apparatus and existence or nonexistence of an error in the data can thus be verified at the same time as the time the data is transferred from the storage apparatus to the host apparatus without the need to read out the duplicated data back from the duplicating apparatus. It is possible to improve reliability of data transferred from the storage apparatus to the host apparatus without sacrificing availability of the data processing system.

FIG. 1 is a diagram showing the principle of a backup system and a duplicating apparatus employed in the backup system according to the aforementioned aspects of the invention. FIG. 2 is a diagram showing control flows of the principle.

As shown in the figure, the backup system comprises a host apparatus 1, a storage apparatus 2 and a duplicating apparatus 3. In the backup system shown in FIG. 1, the host apparatus 1 transfers a signal to the storage apparatus 2 and the duplicating apparatus 3 by a strobe line S to inform the storage apparatus 2 and the duplicating apparatus 3 of whether the current access is an operation to read out data or to write data from/into the storage apparatus 2 and the duplicating apparatus 3. Data is exchanged between the host apparatus 1 and the address of a location in the storage apparatus 2, and the duplicating apparatus 3 through a data bus D. Specified by the host apparatus 1, the address appears on an address bus A.

The duplicating apparatus 3 has a configuration identical with that of the storage apparatus 2. The configuration comprises a control unit 4 and an error-existence/nonexistence-verifying unit 5. That is, the duplicating apparatus 3 also has the error-existence/nonexistence-verifying unit 5 of its own.

In addition, the storage apparatus 2 is connected with the duplicating apparatus 3 by a command line P1 and a command line P2. The command line P1 is used for transferring a code representing a result of verification of error existence or nonexistence from the duplicating apparatus 3 to the storage apparatus 2. On the other hand, the command line P2 is used by the storage apparatus 2 for requesting the duplicating apparatus 3 to serve as a substitute for the storage apparatus 2 in a transfer of data between the storage apparatus 2 and the host apparatus 1. In FIG. 1, the command lines P1 and P2 are each drawn as a bi-directional line. This is because the duplicating apparatus 3 has a physical configuration identical with the storage apparatus 2 so that the function of the storage apparatus 2 can be interchanged with that of the duplicating apparatus 3 during typically initial setting.

In addition, a control line C is connected to a termination unit 6, the host apparatus 1, the storage apparatus 2 and the duplicating apparatus 3. The termination unit 6 is a circuit for connecting the host apparatus 1, the storage apparatus 2 and the duplicating apparatus 3 by wired logic. The termination unit 6 comprises components including pull-up or pull-down resistor circuit.

In FIG. 2, the storage apparatus 2 receives a command from the strobe line S at a step (hereafter, referred to as S1). At S2, the storage apparatus 2 determines whether the command is a data transfer command. If the command is not a data transfer command (S2: NO), the status is reported to the host apparatus 1 (S11). Then, the processing is ended. If the command is a data transfer command (S2: YES), on the other hand, the control flow goes on to S3 to determine whether the command is a command to end a data transfer. If the command is not a command to end a data transfer (S3: NO), the control flow goes on to S4 to determine whether the command is a command to read out data from the storage apparatus 2. If the command is a command to read out data from the storage apparatus 2 (S4: YES), the control flow goes on to S5 to determine whether the command is a command to read out the same data as data read out previously, that is, the command is a retransmission command. If the command is a command to read out the same data as data read out previously, that is, the command is a retransmission command (S5: YES), the control flow goes on to S6 at which the data transfer is switched from the storage apparatus 2 to the duplicating apparatus 3. If the command is not a retransmission command (S5: NO), or if the command is a write command (S4: NO), on the other hand, the control flow goes on to S7 at which data is read out from the storage apparatus 2 without switching the data transfer from the storage apparatus 2 to the duplicating apparatus 3. At S8, a code is transferred. After transferring the data and the code, the control flow goes on to S9 to transmit information on whether or not an error of the data has been detected at the duplicating apparatus 3 from the duplicating apparatus 3 to the storage apparatus 2 through the command line P1. At S10, it is determined whether the processing to transfer data is to be terminated by checking the information on whether or not an error of the data has been detected at the duplicating apparatus 3 and information on whether or not an error of the data has been detected at the storage apparatus 2 itself. If the processing to transfer data is not to be terminated (S10: NO), the control flow goes back to S3 to determine whether the command is a command to end a data transfer. If the command is a command to end a data transfer (S3: YES), the control flow goes on to S11 at which status is reported to the host apparatus 1. Then, the processing is ended. If the processing to transfer data is to be terminated (S10: YES), on the other hand, the control flow also goes on to S11 at which status is reported to the host apparatus 1 before the processing is ended.

The above and further objects and novel features of the invention will more fully appear from following detailed description when the same is read in connection with the accompanying drawings. It is to be expressly understood, however, that the drawings are purpose of illustration only and not intended as a definition of the limits of the invention.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 1 is a diagram showing the principle of a backup system of the invention;

FIG. 2 is a flowchart representing control flows of the principle of the invention;

FIG. 3 is a diagram showing the configuration of a backup system in a first embodiment;

FIG. 4 is a diagram showing the configuration of a backup system in a second embodiment;

FIG. 5 is a diagram showing the configuration of a backup system in a third embodiment;

FIG. 6 is a diagram showing a typical circuit of a termination unit;

FIG. 9 is a diagram showing the configuration of a backup system in a fourth embodiment.

DETAILED DESCRIPTION OF THE PREFERRED EMBODIMENTS

Figure 7:
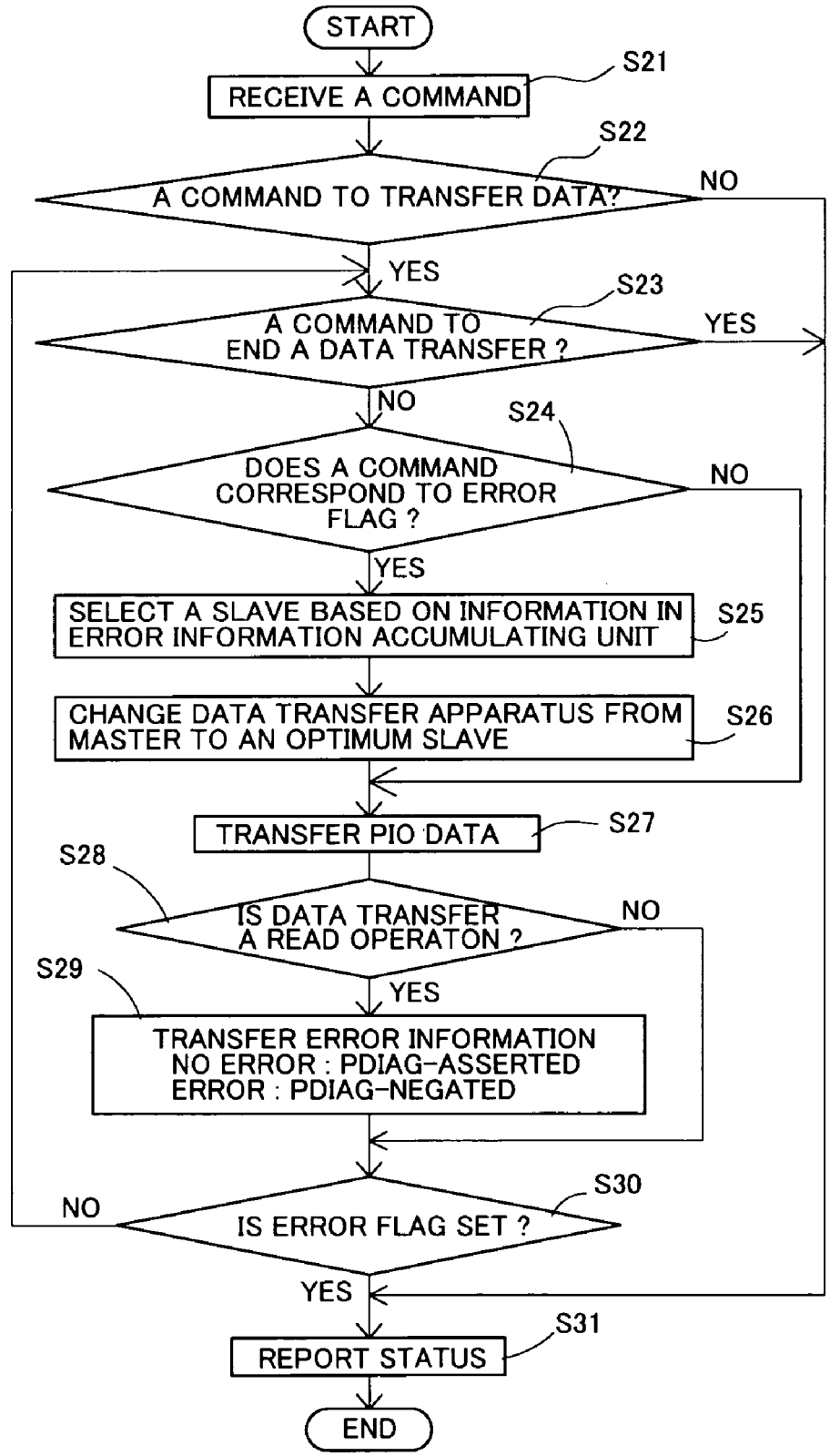
FIG. 7 is a flowchart representing control flows of a first application example of the first to fourth embodiments.
Figure 8:
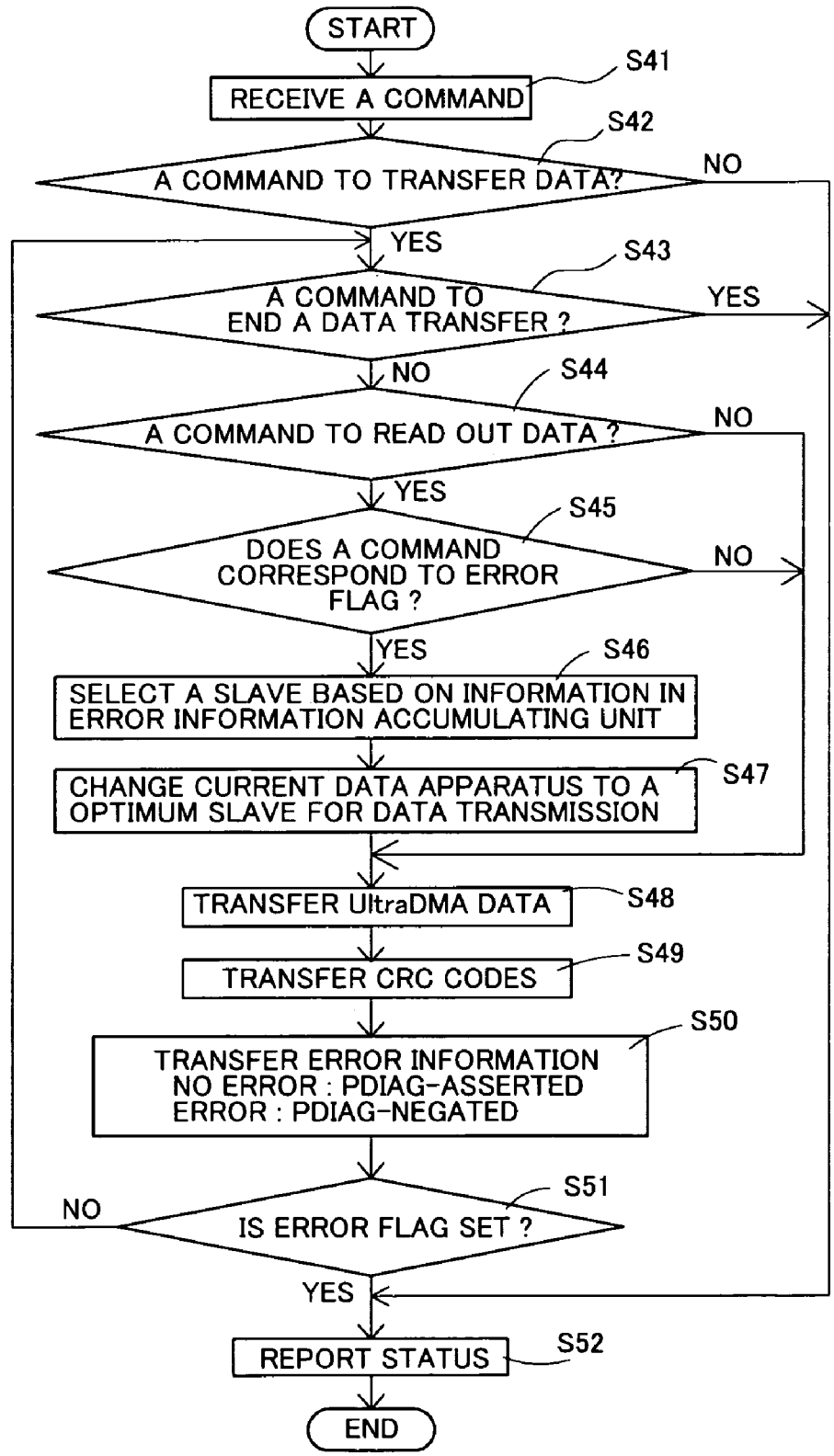
FIG. 8 is a flowchart representing control flows of a second application example of the first to fourth embodiments.

The following description explains first to fourth embodiments each implementing a backup system of the invention in detail by referring to diagrams. FIG. 3 is a diagram showing the configuration of a backup system in a first embodiment; FIG. 4 is a diagram showing the configuration of a backup system in a second embodiment; FIG. 5 is a diagram showing the configuration of a backup system in a third embodiment; FIG. 6 is a diagram showing a typical circuit of a termination unit; FIG. 7 is a flowchart representing control flows of a first application example of the first to a fourth embodiments; FIG. 8 is a flowchart representing control flows of a second application example of the first to fourth embodiments; and FIG. 9 is a diagram showing the configuration of a backup system in a fourth embodiment.

The first to third embodiments each adopt ATA/ATAPI wherein a personal computer 11 serving as the host apparatus operates by being aware of the existence of only one storage apparatus 12 referred to hereafter simply as a master. A duplicating apparatus 13 referred to hereafter as a slave functions as an apparatus for storing a backup of each data. In the following description, the master 12 and the slave 13 are also generically referred to as a data transfer apparatus.

In the backup system of first embodiment shown in FIG. 3, the personal computer 11 serving as the host apparatus transfers a signal with the data transfer apparatus by a strobe line 1S1 to inform the data transfer apparatus of whether the current access is an operation to read out data from the data transfer apparatus or an operation to write data into the data transfer apparatus. Data is exchanged between the personal computer 11 and the address of a location in the data transfer apparatus through a data bus 1D. Specified by the personal computer 11, the address appears on an address bus 1A. If necessary, the personal computer 11 uses a strobe line 1S2 typically to issue a command for requesting the data transfer apparatus to receive codes indicating existence or nonexistence of an error calculated by the personal computer 11 to the data transfer apparatus through the data bus 1D.

The master 12 and the slave 13 are connected to each other by a bi-directional command line 1P functioning as the command line P1 of FIG. 1 for transferring information on an error, that is, codes indicating existence or nonexistence of an error, and functioning as the command line P2 of FIG. 1 for changing the data transfer apparatus. That is, the command line 1P is a configuration element serving as an information transfer unit for transferring information on an error from the slave 13 to the master 12 as well as a configuration element serving as a switching unit for switching the current data transfer apparatus from the master 12 to the slave 13.

In addition, a control line 1C is connected to the personal computer 11, the master 12 and the slave 13. Much like the configuration of the principle shown in FIG. 1, a termination unit 16 implemented by pull-up or pull-down resistor circuit is used for terminating the control line 1C. The control line 1C is used for transmitting control signals from the master 12 and the slave 13 so that data can be transferred from either the master 12 or the slave 13 to the personal computer 11 without a contention for the data bus 1D and the address bus 1A between the master 12 and the slave 13. The strobe line 1S1, the strobe line 1S2 and the control line 1C jointly constitute an input/output control unit for facilitating control of operations to input data from the master 12 and the slave 13 to the personal computer 11 and output data from the personal computer 11 to the master 12 and the slave 13.

As a typical implementation of the functions of the strobe line 1S1, the strobe line 1S2, the control line 1C and the command line 1P in a transfer of PIO data represented by a flowchart shown in FIG. 7, an XDIOR/XDIOW signal asserted on the strobe line 1S1 informs the master 12 and the slave 13 of a write or read timing of the transfer of PIO data to be described later. An IORDY-signal is transferred through the control line 1C connected to a pull-up resistor of FIG. 6A employed in the unit 16. The IORDY-signal is used to control an operation of temporarily halting a transfer of data to or from the master 12 or the slave 13 in order to prevent an overflow or an underflow from occurring in the transfer of data. A PDIAG signal is transmitted between the master 12 and the slave 13 through the command line 1P to convey codes verifying existence/nonexistence of an error obtained as a result of comparison. On the other hand, the PDIAG signal is transmitted from the master 12 to the slave 13 through the command line 1P to designate the slave 13 as a data transfer apparatus serving as a substitute for the master 12. The IORDY signal transferred through the control line 1C and the XDIOR/XDIOW signal asserted on the strobe line 1S1 jointly serve as an input/output control unit for controlling operations to transfer data from the personal computer 11 to the master 12 and the slave 13 or vice versa. On the other hand, the PDIAG-signal is used by the slave 13 as a configuration element of an information transfer unit and used by the master 12 as a configuration element of a switching unit for designating the slave 13 as a data transfer apparatus serving as a substitute for the master 12.

In an UltraDMA represented by a flowchart shown in FIG. 8, the XDIOR/XDIOW signal is asserted on the strobe line 1S1. A DMACK-signal is asserted on the strobe line 1S2 to inform a data transfer apparatus that the personal computer 11 is transferring an error detection/correction codes obtained as a result of processing carried out by the personal computer 11. An IORDY-signal is transferred through the control line 1C connected to a pull-down resistor of FIG. 6B employed in the unit 16. The IORDY-signal is used to control an operation of temporarily halting a transfer of data to or from the master 12 and the slave 13 in order to prevent an overflow or an underflow from occurring in the transfer of data. A PDIAG-signal is transmitted through the command line 1P. The XDIOR/XDIOW signal asserted on the strobe line 1S1, the DMACK-signal asserted on the strobe line 1S2 and the IORDY-signal transferred through the control line 1C jointly serve as an input/output control unit for controlling operations to transfer the codes from the personal computer 11 to the master 12 or the slave 13. On the other hand, the PDIAG-signal is used by the slave 13 as a configuration element of an information transfer unit and used by the master 12 as a configuration element of a switching unit for designating the slave 13 as a data transfer apparatus serving as a substitute for the master 12.

As explained in the description of the principle of the invention by referring to FIG. 1, the master 12 and the slave 13 have an identical configuration comprising a control unit 14 and an error-existence/nonexistence-verifying unit 15.

The control unit 14 is a control block for controlling transfers of data. The control unit 14 comprises an input buffer 141 and an output buffer 144. The input buffer 141 is a fetching unit for taking in transferred data from the data bus 1D to be stored at an address appearing on the address bus 1A according to signals asserted on the strobe line 1S1, the strobe line 1S2, the control line 1C and the command line 1P. On the other hand, the output buffer 144 is used for storing data to be transferred to the data bus 1D from an address appearing on the address bus 1A according to signals asserted on the strobe line 1S1, the strobe line 1S2, the control line 1C and the command line 1P. As a configuration element going with the function to switch the current data transfer apparatus, the output buffer 144 is provided with a function to set an output terminal of the output buffer 144 in a high-impedance (Hi-Z) state.

Data received from the data bus 1D by way of the input buffer 141 is stored in the storage medium 146. On the other hand, data stored in the storage medium 146 is output to the data bus 1D by way of the output buffer 144. When data is input or output, a signal/data processing unit 142 carries out processing to convert the transfer format of the input data into a storage format or convert the storage format of the output data into the transfer format. The signal/data processing unit 142 also has a data holding unit for temporarily holding data. Examples of the data temporarily held by the data holding unit are data undergoing the processing to convert the format of the data, data being subjected to verification of existence/nonexistence of an error based on error detection/correction codes or codes taken in as a data verification unit or a data comparison unit and data being compared with the backup of the data.

The error-existence/nonexistence-verifying unit 15 comprises a portion for verifying existence or nonexistence of an error based on CRC codes, a portion for comparing and collating data and a portion for processing a result of data coincidence detection.

The portion for verifying existence or nonexistence of an error based on CRC codes comprises a CRC receiving circuit 151, a CRC computing circuit 152 and a coincidence detecting (error detecting) unit 153.

The CRC receiving circuit 151 is a circuit employed in a data transfer apparatus functioning as the slave 13 as a code fetching unit used for taking in CRC codes for verifying existence or nonexistence of an error at the same time as an operation to write data into the master 12 or read out data from the master 12. The CRC receiving circuit 151 employed in a data transfer apparatus also takes in CRC codes for data being written in an operation to write the data into the data transfer apparatus, or CRC codes for data being read out in an operation to read out the data from the data transfer apparatus. The CRC receiving circuit 151 also takes in CRC codes obtained as a result of processing carried out by the personal computer 11 in reception driven by the DMACK-signal appearing on the strobe line 1S2 during a transfer of UltraDMA data. In conjunction with the input buffer 141, the CRC receiving circuit 151 functions as a fetching unit.

When the data transfer apparatus employing the CRC computing circuit 152 functions as the slave 13 for taking in data, or when the data transfer apparatus employing the CRC computing circuit 152 stores input data into its own storage medium 146 or outputs data stored in its own storage medium 146, the CRC computing circuit 152 works as a circuit for computing CRC codes.

The coincidence detecting (error detecting) unit 153 verifies that CRC codes actually taken in by the CRC receiving circuit 151 matches CRC codes computed by the CRC computing circuit 152 based on transferred data. In the case of an UltraDMA data transfer, the coincidence detecting (error detecting) unit 153 verifies that CRC codes computed by the CRC computing circuit 152 matches CRC codes actually received by the CRC receiving circuit 151 in the transfer, which is driven by the DMACK-signal appearing on the strobe line 1S2. Thus, the coincidence detecting (error detecting) unit 153 serves as a data verifying unit.

The portion for comparing and collating data comprises a data comparing unit 154 and a coincidence detecting unit 155. This portion serves as a data comparing unit for recognizing coincidence of data read out from the master 12 with the backup of the data stored in the slave 13 when the data transfer apparatus including this portion is set to function as the slave 13.

In detail, the data read out from the master 12 and the backup of the data stored in the slave 13 are supplied to the data comparing unit 154 for comparing them with each other, and the coincidence detecting unit 155 detects coincidence of the data read out from the master 12 with the backup of the data stored in the slave 13. The backup of the data stored in the slave 13 was stored in the storage medium 146 after completing format-conversion processing carried out by the signal/data processing unit 142 when the data presently read out from the master 12 was written into the master 12 and, at the same time, the input buffer 141 employed in the slave 13 to be finally stored in the storage medium 146 as the backup of data stored in the slave 13.

The portion for processing a result of data coincidence detection comprises an error flag unit 156, an error information detecting unit 157, an error information accumulating unit 158 and a switching control unit 159.

The error flag unit 156 is connected to the output of the coincidence detecting (error detecting) unit 153 serving as a data verifying unit in the portion for verifying existence or nonexistence of an error based on CRC codes, the output of the coincidence detecting unit 155 serving as a principal component of the data comparing unit and the output of the error information detecting unit 157 for detecting an error transmitted by a PDIAG-signal in the event of an error detected by the data verifying unit and the data comparing unit, which are employed in the slave 13. The error flag unit 156 sets an error flag for information on an error detected at least by one of the coincidence detecting unit (error detecting) 153, the coincidence detecting unit 155 and the error information detecting unit 157. The master 12 controls the switching control unit 159 functioning as a switching control unit based on the error flag unit 156 and the error information accumulating unit 158. In this way, the data transfer apparatus is changed from the master 12 to the master 13 for transferring data in place of the master 12 in the event of an error. In addition, the error flag unit 156 is also a configuration element serving as a notifying unit for informing the personal computer 11 of an error.

The error information detecting unit 157 is a portion for detecting information on an error detected in the slave 13. The information is transmitted to the master 12 by a PDIAG-signal. The error is detected in the slave 13 during verification of existence or nonexistence of an error carried out at the same time as an operation to input or output data to or from the master 12. The error may also be detected in an operation to output data from the slave 13 itself. A result of detection is supplied to the error flag unit 156 and the error information accumulating unit 158.

The error information accumulating unit 158 accumulates only information on an error detected in an operation to output data from the slave 13 itself. The error information accumulating unit 158 can collect an error detection rate for each address in the slave 13 and each data type. In this way, reliability of the backup of each data in the slave 13 can be improved. Particularly, in the case of a multi-slave configuration comprising slaves 431 and 432 like a fourth embodiment to be described later by referring to FIG. 9, error detection rates for the slaves 431 and 432 can be obtained to make the backup system safer and more reliable. The error information accumulating unit 158 functions as an information accumulating unit.

The switching control unit 159 is a portion serving as a switching control unit for changing the current data transfer apparatus from the master 12 to the slave 13 in the event of an error detected in an operation to transfer data in the master 12. In detail, when an error flag in the error flag unit 156 is set due to occurrence of an error, control is executed to change the current data transfer apparatus from the master 12 to an optimum slave 13 determined by the error information accumulating unit 158. Therefore, it is not necessary at all for the personal computer 11 to be aware of the change of the data transfer apparatus controlled by the switching control unit 159. It is thus possible to change the current data transfer apparatus from the master 12 to the slave 13 at a high speed without increasing a processing load borne by the personal computer 11.

The processing unit for processing a result of coincidence detection in the error verifying unit 15 and the control portion of the control unit 14 jointly constitute the control circuit 143.

According to the configuration described above, in a transfer of data from the personal computer 11 to the master 12, the CRC receiving circuit 151 employed in the slave 13 takes in the data. In addition, CRC codes are also taken in as well at the same time. The fetched data is stored in the storage medium 146 employed in the slave 13 as a backup of the data. The coincidence detecting (error detecting) unit 153 serving as a part of the error verifying unit 15 can recognize existence or nonexistence of an error based on the fetched data and the fetched CRC codes. Thus, reliability of the backup of the data stored in the slave 13 can be improved. It is possible to realize excellent reliability of data in the backup system. In addition, since it is not necessary to transmit the data itself for verifying the data stored in the slave 13 from the slave back to the personal computer 11, the availability of the data processing system is improved.

Furthermore, when data and CRC codes are transferred from the master 12 to the personal computer 11, the input buffer 141 employed in the slave 13 takes in the data and the CRC receiving circuit 151 employed in the slave 13 takes in the CRC codes. In the slave 13, the data comparing unit 154 and the coincidence detecting unit 155 determine whether the fetched data matches the backup of the data already stored in the storage medium 146. As an alternative, the coincidence detecting (error detecting) unit 153 employed in the error verifying unit 15 verifies existence or nonexistence of an error based on the fetched CRC codes and the data already stored in the storage medium 146. Thus, it is possible to improve reliability of data transferred from the master 12 to the personal computer 11. Since data output by the master 12 can be compared with and verified against the backup of the data already stored in the slave 13 in a transfer of the data, improved reliability of data can be assured without reducing the availability of the data processing system.

In addition, the control line 1C is a line common to the personal computer 11, the master 12 and the slave 13. The IORDY-signal asserted by the master 12 or the slave 13 on the control line 1C controls a transfer of PIO data. On the other hand, the IORDY-signal asserted by the master 12 or the slave 13 on the control line 1C controls an UltraDMA transfer. Thus, transfers of data can be controlled to produce flows without a contention for the data bus 1D between the slave 13 and the master 12. It is possible to execute highly reliable control utilizing the responsive performance of each of the storage apparatus and the duplicating apparatus to its maximum while letting the apparatuses carry out operations without a contention for the data bus 1D between the slave 13 and the master 12, without generating a wasteful idle period and without causing an overflow and an underflow of data due to a difference in access speed and other attributes between the storage apparatus and the duplicating apparatus in execution of flow control.

Moreover, the PDIAG-signal asserted on the command line 1P conveys information representing a result of recognition of an error obtained in the slave 13 to the master 12. Such an error is recognized when data transferred to the master 12 is taken in by the slave 13 as a backup of the data or recognized as a result of typically comparison of data transferred from the slave 12 with the backup of the data already stored in the slave 13. In this way, the master 12 can easily obtain a result of recognition of a data error in the slave 13. This capability contributes much to improvement of reliability of the backup system. In a transfer of data from the master 12 to the personal computer 11, the master 12 implements the transfer of the data to the personal computer 11 only after verifying that a result of comparison of the data with the backup of the data in the slave 13 indicates that the backup of the data stored in the slave 13 matches the data to be transferred. It is thus unnecessary for the slave 13 to transfer back the backup of the data to the personal computer 11. It therefore takes only a short time to obtain a result of recognition based on the backup of the data from the slave 13. It is possible to maintain high availability of the data processing system while assuring reliability of the backup of the data.

In addition, the master 12 can change the data transfer apparatus from the master 12 itself to the slave 13 after verifying that an error exists. The existence of an error is verified as a result of recognition of the error in the master 12 itself or indicated by the PDIAG-signal received from the slave 13 through the command line 1P as a result of comparison of the backup of the data with data transferred from the master 12. Thus, correct data can be transferred without the need to carry out complex processing such control of changing the data transfer apparatus by the personal computer 11. It is possible to maintain high availability of the data processing system.

Moreover, the master 12 can report information on an error including a result of recognition of error existence in the slave 13 along with information on an error detected in the master 12 itself to the personal computer 11. Thus, the personal computer 11 can easily obtain information on existence or nonexistence of an error from the whole backup system including the slave 13. As a result, by obtaining a minimum possible amount of information on existence or nonexistence of an error in the storage and duplicating apparatuses, it is possible to assure reliability of data stored in the backup system including the master 12 and the slave 13 while maintaining high availability of the data processing system.

In a backup system of the second embodiment, as shown in FIG. 4, the functions and the effects of a personal computer 21, a termination unit 26, a strobe line 2S1, a strobe line 2S2, a control line 2C, a command line 2P, an address bus 2A and a data bus 2D are identical with the configurations, the functions and the effects of the personal computer 11, the termination unit 16, the strobe line 1S1, the strobe line 1S2, the control line 1C, the command line 1P, the address bus 1A and the data bus 1D, which are employed in the first embodiment. Thus, the second embodiment executes the same operations and functions as the first embodiment. The second embodiment exhibits the same effects as the first embodiment.

In addition, except for addition of a buffer unit 245 to a configuration element called a control unit 24, the configurations of the master 22 and the slave 23 remain unchanged. Specifically, the configurations of an input buffer 241, an output buffer 244, a signal/data processing unit 242 and a storage medium 246, which are employed in the control unit 24, are identical with their respective counterparts in the master 12 and the slave 13 in the first embodiment. By the same token, the configurations of a CRC reception circuit 251, a CRC computing circuit 252, a coincidence detecting (error detecting) unit 253, a data comparing unit 254, a coincidence detecting unit 255, an error flag unit 256, an error information detecting unit 257, an error information accumulating unit 258 and a switching control unit 259, which are employed in a configuration element referred to as an error verifying unit 25, are identical with their respective counterparts in the master 12 and the slave 13 in the first embodiment. Thus, the second embodiment executes the same operations and functions as the first embodiment. The second embodiment exhibits the same effects as the first embodiment.

In the control unit 24, the buffer unit 245 is arranged between the signal/data processing unit 242 and the storage medium 246 for storing data. The signal/data processing unit 242 is used for processing data input through the input buffer 241 and data to be output by way of the output buffer 244. The data processing carried out by the signal/data processing unit 242 includes format conversion of data. The buffer unit 245 is also used for storing data to be processed by the CRC computing circuit 252 for computing CRC codes and results of processing carried out by the CRC computing circuit 252. In addition, the buffer unit 245 is also used for storing data to be compared by the data comparing unit 254. The buffer unit 245 plays the role of adjusting differences in speed between processing to input and output data as well as processing to convert the format of data and internal processing.

Even in the case of data input and output at a high speed, the differences in processing speed can be absorbed so that it is possible to implement smooth data transfer processing.

In a backup system of a third embodiment, as shown in FIG. 5, the backup system has the same configuration as the first embodiment. In the third embodiment, the configurations, the functions and the effects of a personal computer 31, a termination unit 36, a strobe line 3S1, a strobe line 3S2, a control line 3C, a command line 3P, an address bus 3A and a data bus 3D are identical with the configurations, the functions and the effects of the personal computer 11, the termination unit 16, the strobe line 1S1, the strobe line 1S2, the control line 1C, the command line 1P, the address bus 1A and the data bus 1D, which are employed in the first embodiment. Thus, the third embodiment executes the same operations and functions as the first embodiment. The third embodiment exhibits the same effects as the first embodiment. In addition, the configurations of the master 32 and the slave 33 remain unchanged. Specifically, the configurations of an input buffer 341, an output buffer 344, a signal/data processing unit 343 and a storage medium 346, which are employed in the control unit 34, are identical with their respective counterparts in the master 12 and the slave 13 in the first embodiment. By the same token, the configurations of a CRC reception circuit 351, a CRC computing circuit 352, a coincidence detecting (error detecting) unit 353, a data comparing unit 354, a coincidence detecting unit 355, an error flag unit 356, an error information detecting unit 357, an error information accumulating unit 358 and a switching control unit 359, which are employed in a configuration element referred to as an error verifying unit 35, are identical with their respective counterparts in the master 12 and the slave 13 in the first embodiment. Thus, the third embodiment executes the same operations and functions as the first embodiment. The third embodiment exhibits the same effects as the first embodiment.

It should be noted, however, that components, which are employed in the error verifying unit 35 and the control unit 34 and used for carrying out control functions in the third embodiment, are each implemented software executed by a microprocessor (referred to as an MPU) 343. Thus, by modifying the software executed by the MPU 343, it is possible to provide a backup system capable of keeping up with variations in data-processing-system configuration with a high degree of flexibility.

In the fourth embodiment of the backup system shown in FIG. 9, the fourth embodiment implements a backup system having a multi-slave configuration in which 2 slaves 431 and 432 are provided for one master 42. In the fourth embodiment, the configurations, the functions and the effects of a personal computer 41, a termination unit 46, a strobe line 4S1, a strobe line 4S2, a control line 4C, an address bus 4A and a data bus 4D are identical with the configurations, the functions and the effects of the personal computer 11, the termination unit 16, the strobe line 1S1, the strobe line 1S2, the control line 1C, the command line 1P, the address bus 1A and the data bus 1D, which are employed in the first embodiment. Thus, the fourth embodiment executes the same operations and functions as the first embodiment. The fourth embodiment exhibits the same effects as the first embodiment.

In addition, the master 42 can be designed into the same configuration as the masters 12, 22 and 32 whereas the slaves 431 and 432 can each be made identical with the slaves 13, 23 and 33. Thus, the fourth embodiment executes the same operations and functions as the first, second and third embodiments. The fourth embodiment exhibits the same effects as the first, second and third embodiments.

Command lines 4P1 and 4P2 connect the master 42 to the slaves 431 and 432. The command lines 4P1 and 4P2 are used for providing the master 42 with results of comparison of codes for verifying existence or nonexistence of an error in the slaves 431 and 432. The command lines 4P1 and 4P2 are also used by the master 42 for transmitting a command to the slaves 431 or 432. The command switches the current data transfer apparatus from the master 42 to the slave 431 or 432.

By accumulating each error information of the slaves 431 and 432 to the error information accumulating units 158, 258 and 358 as an information accumulating unit, it is possible to accumulate information on error-detection rates due to differences in data type and address for each of the slaves 431 and 432. Thus, it is possible to select a slave to serve as a backup apparatus optimum for a data type or an address based on this information and, hence, to implement a safe and highly reliable backup system. The reliability of the data processing system can be improved.

The following description explains control flows of a data transfer in the first to fourth embodiments by referring to FIGS. 7 and 8. FIG. 7 is a flowchart representing a first application example of transferring PIO data and FIG. 8 is a flowchart representing a second application example of an UltraDMA data transfer.

The flowchart shown in FIG. 7 begins with S21 at which a command is received from the strobe line 1S1, 2S1, 3S1 or 4S1. The control flow then goes on to S22 to determine whether the command is the XDIOR/XDIOW signal making a request for an operation to write or read out data. If the command is the XDIOR/XDIOW signal (S22: YES), the control flow goes on to S23 to determine whether the transfer of data has been completed. If the transfer of data has not been completed (S23: NO), it is determined whether the command is a request for a transmission of data (S24 to S26). If the command is a request for a retransmission (S24: YES), the control flow goes on to S25 and then to S26. Concretely, the error flag in the error flag unit 156, 256, or 356 found set at S24 indicates that the received command is a request for a retransmission. In this case, the control flow goes on to S25 to select an optimum slave based on information in the error information accumulating unit 158, 258, or 358. In actuality, there is only one slave 13, 23 or 33 in the first, second or third embodiment. As shown in FIG. 9, however, the fourth embodiment has a multi-slave configuration including the slaves 431 and 432 from which an optimum slave can be selected. At S26, the switching control unit 159, 259, or 359 outputs the PDIAG-signal conveying a command to designate the optimum slave as a data transfer apparatus serving as a substitute for the master. Specifically, the current data transfer apparatus is changed from the master 12, 22 or 32 to the slave 13, 23 or 33. In the case of the fourth embodiment, the current data transfer apparatus is changed from the master 42 to the slave 431 or 432. The pieces of processing carried out at the steps S24, S25 and S26 of the control flow serve as a switching unit. On the other hand, an error flag in the error flag unit 156, 256 or 356 found reset at S24 (S24: NO), indicates that the received command is not a request for a retransmission of data to the personal computer 11, 21, 31, 41. In this case, the processing to change the current data transfer apparatus is not carried out.

In this way, the master 12, 22, 32 or 42 can switch the data transfer operation carried out thereby to the slave 13, 23, 33 or either 431 or 432 depending on information on an error. The error may be detected by the master 12, 22, 32 or 42 itself or detected by the slave 13, 23, 33, 431 or 432 as a result of comparison of data being transferred with the backup of the data. This error is indicated by the PDIAG-signal transmitted by the slave 13, 23, 33 or either 431 or 432 to the master 12, 22, 32 or 42 by the command line 1P, 2P, 3P or either 4P1 or 4P2. Information on an error detected by the slave 13, 23, 33, 431 or 432 is transmitted to the error flag unit 156, 256, or 356 of the master 12, 22, 32, or 42. The information is then reported to the master 12, 22, 32 or 42 (S24: YES). At S25, the use of the slave 13, 23, 33 or either 431 or 432 is determined based on information in the error information accumulating unit 158, 258 and 358. Then, at the next S26, the current data transfer apparatus is changed to the slave determined at S25. It is thus possible to transfer correct data and to maintain the high availability of the data processing system without the need for the personal computer 11, 21, 31 or 41 to carry out complex processing such as control to change the current data transfer apparatus by itself.

At S27 or at a stage where the data transfer apparatus has been confirmed, PIO data is transferred. At S28, it is determined whether the data transfer is a read operation. If the data transfer is a write operation (S28: NO), the data is not checked for possible existence of an error. If the data transfer is a read operation (S28: YES), the slave 13, 23 or 33 transmits the PDIAG-signal representing information on an error to the error information detecting unit 157, 257 or 357 employed in the master 12, 22 or 32 at S29. In the fourth embodiment, the slaves 431 and 432 each transmit the PDIAG-signal representing information on an error to the master 42. The information on an error transmitted by the slave 13, 23 or 33 is obtained as a result of comparison of data read out from the master 12, 22 or 32 with the backup of the data stored in the slave 13, 23 or 33. In the fourth embodiment, the pieces of information on an error transmitted by the slaves 431 and 432 are obtained as results of comparison of data read out from the master 42 with the backups of the data stored in the slaves 431 and 432. The information may also indicate existence or nonexistence of an error detected in data read out from the slave 13, 23, 33, 431 or 432 after the data transfer apparatus has been changed to the slave 13, 23, 33, 431 or 432. At S29, if no error indicated by a data mismatch is determined to exist, the PDIAG-signal is asserted. If an error indicated by a data mismatch is determined to exist, the PDIAG-signal is negated. The step 2 of the control flow serves as an information transferring unit.

In this way, a result of verification of existence or nonexistence of an error generated by the slave 13, 23, 33 or either 431 or 432 is reported to the master 12, 22, 32 or 42 at S29. Thus, the master 12, 22, 32 or 42 can easily obtain results of verification of existence or nonexistence of an error generated by the slaves 13, 23, 33, or 431 and 432, increasing the reliability of the data processing system considerably. After the slave 13, 23 or 33 produces a result of comparison indicating that data being read out from the master 12, 22 or 32 matches the backup of the data stored in the slave 13, 23 or 33 in a transfer of the data from the master 12, 22 or 32 to the personal computer 11, 21 or 31, the master 12, 22 or 32 executes the transfer of the data. In the case of the fourth embodiment, after the slaves 431 and 432 produce results of comparison indicating that data being read out from the master 42 matches the backups of the data stored in the slaves 431 and 432 in a transfer of the data from the master 42 to the personal computer 41, the master 42 executes the transfer of the data. It is thus unnecessary for the slaves 13, 23, 33 and 431, 432 to transmit the backup of the data back to the personal computer 11, 21, 31 and 41. It takes only a short time to obtain a result of recognition based on the backups of the data from the slaves 13, 23, 33 or 431, 432. It is possible to maintain high availability of the data processing system while assuring reliability of a backup of data.

In an operation to read out data from the master 12, 22, 32 or 42, the master 12, 22, 32 or 42 receives information on an error for the data from the slaves 13, 23, 33 or 431, 432, and then determines whether an error exists in the data based on the received information on an error and information on an error generated by the master 12, 22, 32 or 42 itself. The result of the determination is stored in as an error flag in the error flag unit 156, 256, or 356. At S30, the error flag in the error flag unit 156, 256, or 356 is examined to determine whether the error flag is set. If the error flag is set (S30: YES), the control flow goes on to S31 at which the master 12, 22, 32 or 42 reports the error status to the personal computer 11, 21, 31 or 41 serving as the host apparatus. The control flow is then terminated. The reported error status represents information on an error detected in the master 12, 22, 32 or 42 itself and information on an error detected in the slaves 13, 23, 33 or 431, 432. The pieces of processing carried out at the steps S30 and S31 of the control flow serve as a status notifying unit. If the error flag is reset to indicate no detected error (S30: NO), on the other hand, the control flow goes back to S23 to determine whether the transfer of data has been completed. If the transfer of data has not been completed (S23: NO), the pieces of processing of S24 and the subsequent steps are carried out again. If the transfer of data has been completed (S23: YES), on the other hand, the control flow goes on to S31 at which the master 12, 22, 32 or 42 informs the personal computer 11, 21, 31 or 41 serving as the host apparatus of completion of the data transfer. The control flow is then terminated.

It should be noted that if the received command is not a data transfer command (S22: NO), the control flow goes on to S31 at which the master 12, 22, 32 or 42 informs the personal computer 11, 21, 31 or 41 that the received command is not a data transfer command. The control flow is then terminated.

In this way, at the steps S30 and S31, the master 12, 22, 32 or 42 can notify the personal computer 11, 21, 31 or 41 of error status representing information on an error detected in the master 12, 22, 32 or 42 itself and information on an error detected in the slaves 13, 23, 33 or 431, 432. Thus, the personal computer 11, 21, 31 or 41 can easily obtain information on existence of an error for the entire backup system including the slaves 13, 23, 33 or 431, 432. That is, since the personal computer 11, 21, 31 or 41 can obtain a minimum possible amount of information on existence or nonexistence of an error in the storage and duplicating apparatuses, that is, the master 12, 22, 32 or 42 and the slaves 13, 23, 33 or 431, 432, it is possible to assure reliability of data stored in the backup system including the master 12, 22, 32 or 42 and the slaves 13, 23, 33 or 431, 432 while maintaining high availability of the data processing system.

In the flow of control of FIG. 8, like the control flows shown in FIG. 7, a command is received at S41, the determination is made whether the command is the XDIOR/XDIOW signal making a request for an operation to write or read out data at S42. If the command is the XDIOR/XDIOW signal (S42: YES), the determination is made whether the transfer of data has been completed at S43. If the transfer of data has not been completed (S43: NO), the determination is made whether the command is a request for a read operation at S44. If the command is a request for a read operation (S44: YES), the determination is made whether the command is a request for a retransmission of data at S45. If the command is a request for a retransmission (S45: YES), the control flow goes on to S46 and S47. Concretely, an error flag in the error flag unit 156, 256 or 356 found set at S45 indicates that the received command is a request for a retransmission as is the case with the flowchart shown in FIG. 7. In this case, the control flow goes on to S46 to select an optimum slave based on information in the error information accumulating unit 158, 258 or 358.

As shown in FIG. 9, the fourth embodiment has a multi-slave configuration including the slaves 431 and 432 from which an optimum slave can be selected. At S47, the switching control unit 159, 259 or 359 outputs the PDIAG-signal conveying a command to change the current data transfer apparatus to the optimum slave. On the other hand, when the received command is a request for a write operation (S44: NO), and when an error flag in the error flag unit 156, 256 or 356 found reset at S45, it is indicated that the received command is not a request for a retransmission. The processing to change the current data transfer apparatus is not carried out.

In this way, the master 12, 22, 32 or 42 can switch the data transfer operation carried out thereby to the slave 13, 23, 33 or either 431 or 432 depending on information on an error. The error may be detected by the master 12, 22, 32 or 42 itself or detected by the slave 13, 23, 33, 431 or 432 as a result of comparison of data being transferred with the backup of the data. This error is indicated by the PDIAG-signal transmitted by the slave 13, 23, 33 or either 431 or 432 to the master 12, 22, 32 or 42 through the command line 1P, 2P, 3P or either 4P1 or 4P2. Information on an error detected by the slave 13, 23, 33, 431 or 432 is transmitted to the error flag unit 156, 256, or 356 of the master 12, 22, 32, or 42. The information is then reported to the master 12, 22, 32 or 42 (S24: YES). At S46, the use of the slave 13, 23, 33 or either 431 or 432 is determined based on information in the error information accumulating unit 158, 258 and 358. Then, at S47, the current data transfer apparatus is changed to the slave determined at S45. It is thus possible to transfer correct data and to maintain the high availability of the data processing system without the need for the personal computer 11, 21, 31 or 41 to carry out complex processing such as control to change the current data transfer apparatus by itself.

At S48 the data transfer apparatus has been confirmed, ultra DMA data is transferred. At S49, CRC codes are transferred. At S50, the slave 13, 23 or 33 transmits the PDIAG-signal representing information on an error to the error information detecting unit 157, 257 or 357 employed in the master 12, 22 or 32. In the fourth embodiment, the slaves 431 and 432 each transmit the PDIAG-signal representing information on an error to the master 42. The information on an error transmitted by the slave 13, 23 or 33 is obtained as a result of comparison of data read out from the master 12, 22 or 32 with the backup of the data stored in the slave 13, 23 or 33. In the fourth embodiment, the pieces of information on an error transmitted by the slaves 431 and 432 are obtained as results of comparison of data read out from the master 42 with the backups of the data stored in the slaves 431 and 432. The information represents a result of comparison of the CRC codes received at S49 with CRC codes computed by the slaves 13, 23, 33 or 431, 432 for the backups of the data stored in the slaves 13, 23, 33 or 431. In addition, the information also indicates existence or nonexistence of an error detected by the CRC codes of data stored in the slave 13, 23, 33, 431 or 432 at an address specified at S49 after the data transfer apparatus has been changed to the slave 13, 23, 33, 431 or 432. If no error indicated by a data mismatch is determined to exist, the PDIAG-signal is asserted. If an error indicated by a data mismatch is determined to exist, the PDIAG-signal is negated. The step S50 of the control flow serves as an information transferring unit.

In this way, a result of verification of existence or nonexistence of an error generated by the slave 13, 23, 33 or either 431 or 432 is reported to the master 12, 22, 32 or 42 at S50. Thus, the master 12, 22, 32 or 42 can easily obtain results of the verification generated by the slaves 13, 23, 33, or 431 and 432, thereby increasing the reliability of the data processing system considerably. After the slave 13, 23 or 33 produces a result of comparison indicating that the CRC codes transferred at S49 to the master 12, 22 or 32 matches the CRC codes computed for the backup of the data stored in the slave 13, 23 or 33, the master 12, 22 or 32 will allow a transfer of data stored at the address specified at S49 to the personal computer 11, 21, 31. In the fourth embodiment, after the slaves 431 and 432 produce results of comparison indicating that the CRC codes transferred at S49 to the master 42 matches the CRC codes computed for the backups of the data stored in the slaves 431 and 432, the master 42 will allow a transfer of data stored at the address specified at S49 to the personal computer 41. It is thus unnecessary for the slaves 13, 23, 33 and 431, 432 to transmit the backups of the data back to the personal computer 11, 21, 31 and 41. It takes only a short time to obtain a result of recognition based on the backup of the data from the slaves 13, 23, 33, 431 and 432. It is possible to maintain high availability of the data processing system while assuring reliability of backup of the data.

The master 12, 22, 32 or 42 receives information on an error for the data from the slaves 13, 23, 33 or 431, 432, and determines whether an error exists in the data based on the received information on an error as well as information on an error generated by the master 12, 22, 32 or 42 itself in an operation to read out data from the master 12, 22, 32 or 42. The result is stored in as an error flag in the error flag unit 156, 256, or 356. At S51, the error flag in the error flag unit 156, 256, or 356 is found, the determination is made whether the error flag is set. If the error flag is set (S51: YES), the master 12, 22, 32 or 42 reports the error status to the personal computer 11, 21, 31 or 41 serving as the host apparatus at S52. The step S52 of the control flow serves as a notifying unit. The reported error status represents information on an error detected in the master 12, 22, 32 or 42 itself and information on an error detected in the slaves 13, 23, 33 or 431, 432. If there is no detected error (S51: NO), the control flow goes back to S43 to determine whether the transfer of data has been completed. If the transfer of data has not been completed (S43: NO), the processing of S44 and the subsequent steps are carried out again. If the transfer of data has been completed (S43: YES), the completion of the data transfer is reported to the host apparatus such as the personal computer 11, 21, 31 or 41 at S52, and then the control of the flow is terminated. It should be noted that if the received command is not a data transfer command (S42: NO), like in the case shown in FIG. 7, it is reported that the received command is not a data transfer command at S52, and then the control of the flow is terminated.

In this way, at S51 and S52, the master 12, 22, 32 or 42 can notify the personal computer 11, 21, 31 or 41 of error status representing information on an error detected in the master 12, 22, 32 or 42 itself and information on an error detected in the slaves 13, 23, 33 or 431, 432. Thus, the personal computer 11, 21, 31 or 41 can easily obtain information on existence of an error for the entire backup system including the slaves 13, 23, 33 or 431, 432. That is, since the personal computer 11, 21, 31 or 41 can obtain a minimum possible amount of information on existence or nonexistence of an error in each of the apparatuses, the reliability of data stored in the backup system including the master 12, 22, 32 or 42 and the slaves 13, 23, 33 or 431, 432 is assured, while maintaining high availability of the data processing system.

As described above in detail, in the backup system according to the first embodiment (FIG. 3), the backup system comprises the master 12 and the slave 13 for the personal computer 11, like the configuration of the principle shown in FIG. 1, the personal computer 11 outputs a signal to the data transfer apparatus through a strobe line 1S1 to inform the master 12 of whether the current access is an operation to read out data from the master 12 or an operation to write data into the master 12. If necessary, a strobe line 1S2 is used by the personal computer 11 typically for issuing a command for controlling an operation to transfer codes to the master 12 through the data bus 1D. The codes are obtained by the calculation carried out by the personal computer 11 and used for verification of error existence or nonexistence in data stored at an address appearing on the address bus 1A.

The master 12 and the slave 13 are connected to each other by a bi-directional command line 1P functioning as the command line P1 of FIG. 1 for transferring information on an error, that is, codes indicating existence or nonexistence of an error, and functioning as the command line P2 of FIG. 1 for changing the data transfer apparatus. That is, the command line 1P is a configuration element serving as an information transfer unit for transferring information on an error from the slave 13 to the master 12 as well as a configuration element serving as a switching unit for switching the current data transfer apparatus from the master 12 to the slave 13. In addition, a control line 1C is connected to the personal computer 11, the master 12 and the slave 13. A termination unit 16 implemented by pull-up or pull-down resistor circuit is used for terminating the control line 1C.

The control line 1C is used for transmitting control signals from the master 12 and the slave 13 so that data can be transferred from either the master 12 or the slave 13 to the personal computer 11 without a contention for the data bus 1D between the master 12 and the slave 13. By the combination of the strobe line 1S1, the strobe line 1S2 and the control line 1C, an input/output control unit for controlling operations to input data from the master 12 and the slave 13 to the personal computer 11 and output data from the personal computer 11 to the master 12 and the slave 13.

Typically, in a transfer of the PIO data (refer to FIG. 7), an XDIOR/XDIOW signal is asserted on the strobe line 1S1. An IORDY-signal is transferred through the control line 1C connected to a pull-up resistor of FIG. 6A employed in the unit 16. A PDIAG-signal is exchanged between the slave 13 and the master 12 through the command line 1P. By the combination of the IORDY signal and XDIOR/XDIOW signal, there is constituted an input/output control unit for controlling operations to output/input data to/from the master 12 and the slave 13. The PDIAG-signal serves as a configuration element of an information transfer unit employed in the slave 13, as well as serves as a configuration element of a switching unit employed in the master 12 for changing the current data transfer apparatus.

In an UltraDMA (refer to FIG. 8), the XDIOR/XDIOW signal is asserted on the strobe line 1S1 and a DMACK-signal is asserted on the strobe line 1S2. An IORDY-signal is transferred through the control line 1C connected to a pull-down resistor of FIG. 6B employed in the unit 16. A PDIAG-signal is transmitted through the command line 1P. By the combination of the XDIOR/XDIOW signal, DMACK-signal, and IORDY-signal, an input/output control unit for controlling the input/output data to/from the master 12 and the slave 13. The PDIAG-signal serves as a configuration element of an information transfer unit employed in the slave 13, as well as serves as a configuration element of a switching unit employed in the master 12 for changing the current data transfer apparatus.

The master 12 and the slave 13 have the same configuration, and each master comprises a control unit 14 and an error-existence/nonexistence-verifying unit 15. The control unit 14 for controlling a data transfer comprises an input buffer 141 and an output buffer 144. The input buffer 141 takes in transferred data from the data bus 1D to be stored at an address appearing on the address bus 1A according to signals asserted on the strobe lines 1S1 and 1S2, control line 1C and the command line 1P. The output buffer 144 stores data to be transferred to the data bus 1D from an address appearing on the address bus 1A according to signals asserted on the strobe lines 1S1 and 1S2, control line 1C and the command line 1P. The output buffer 144 has the function to switch the current data transfer apparatus and a function to set its output terminal of the output buffer 144 in a high-impedance (Hi-Z) state. When data is input or output, a signal/data processing unit 142 carries out processing to convert the transfer format. The signal/data processing unit 142 has a data holding unit for temporarily holding data. Examples of the data temporarily held by the data holding unit are data undergoing the processing to convert the format of the data, data being subjected to verification of existence/nonexistence of an error based on an error detection/correction codes or data and data being compared with the backup of the data.

The error-existence/nonexistence-verifying unit 15 comprises a portion for verifying existence or nonexistence of an error based on CRC codes, a portion for comparing and collating data and a portion for processing a result of data coincidence detection.

The portion for verifying existence or nonexistence of an error based on CRC codes comprises a CRC receiving circuit 151, a CRC computing circuit 152 and a coincidence detecting (error detecting) unit 153. The CRC receiving circuit 151 is a circuit employed in the data transfer apparatus functioning as the slave 13 as a code fetching unit used for taking in CRC codes at the same time as an operation to write data into the master 12 or read out data from the master 12. The CRC receiving circuit 151 also takes in CRC codes for data being written in an operation to write the data into the data transfer apparatus or CRC codes for data being read out in an operation to read out the data. The CRC receiving circuit 151 also takes in CRC codes obtained as a result of processing carried out by the personal computer 11 in reception driven by the DMACK-signal appearing on the strobe line 1S2 during an UltraDMA data transfer. In conjunction with the input buffer 141, the CRC receiving circuit 151 functions as a fetching unit.

When the data transfer apparatus employing the CRC computing circuit 152 functions as the slave 13 taking in data, or when the data transfer apparatus employing the CRC computing circuit 152 stores input data into its own storage medium 146 or outputs data stored in its own storage medium 146, the CRC computing circuit 152 works as a circuit for computing CRC codes. The coincidence detecting (error detecting) unit 153 verifies that CRC codes computed by the CRC computing circuit 152 matches CRC codes actually taken in by the CRC receiving circuit 151. In the case of an UltraDMA data transfer, the coincidence detecting (error detecting) unit 153 verifies the matching between CRC codes taken in by the CRC receiving circuit 151. Thus, the coincidence detecting (error detecting) unit 153 serves as a data verifying unit.

The portion for comparing and collating data comprises a data comparing unit 154 and a coincidence detecting unit 155, and serves as a data comparing unit for recognizing coincidence of data read out from the master 12 with data stored in the slave 13. In detail, the data read out from the master 12 and the data stored in the slave 13 are supplied to the data comparing unit 154 for comparing them with each other, and the coincidence detecting unit 155 detects coincidence of the data read out from the master 12 with the data stored in the slave 13.

The portion for processing a result of data coincidence detection comprises an error flag unit 156, an error information detecting unit 157, an error information accumulating unit 158 and a switching control unit 159. The error flag unit 156 is connected to the output of the coincidence detecting (error detecting) unit 153 for verifying existence or nonexistence of an error based on CRC codes, the output of the coincidence detecting unit 155 of the data comparing unit and the output of the error information detecting unit 157 for detecting an error transmitted as a PDIAG-signal in the event of an error detected by the slave 13. The error flag unit 156 sets an error flag for information on an error detected at least by one of the coincidence detecting (error detecting) unit 153, the coincidence detecting unit 155 and the error information detecting unit 157. The master 12 controls the switching control unit 159 functioning as a switching control unit based on the error flag in the error flag unit 156 and information in the error information accumulating unit 158 to change the data transfer apparatus in the event of an error. In addition, the error flag unit 156 is a configuration element serving as a notifying unit for informing the personal computer 11 of an error.

The error information detecting unit 157 is a portion for detecting information on an error detected in the slave 13. The information is transmitted to the master 12 as a PDIAG-signal. The error is detected in the slave 13 during verification of existence or nonexistence of an error carried out at the same time as an operation to input or output data to or from the master 12. The error may also be detected in an operation to output data from the slave 13 itself.

The error information accumulating unit 158 accumulates only information on an error detected in an operation to output data from the slave 13 itself. The error information accumulating unit 158 can collect an error detection rate for each address in the slave 13 and each data type. In this way, reliability of a data backup in the slave 13 can be improved. Particularly, in the case of a multi-slave configuration comprising slaves 431 and 432 (refer to FIG. 9), error detection rates for the slaves 431 and 432 can be obtained to make the backup system safer and more reliable. The error information accumulating unit 158 functions as an information accumulating unit. The switching control unit 159 is a portion serving as a switching control unit for changing the current data transfer apparatus to the slave 13 when an error is detected. In detail, when an error flag in the error flag unit 156 is set due to occurrence of an error, control is executed to change the current data transfer apparatus to an optimum slave 13 determined by the error information accumulating unit 158. Therefore, it is not necessary at all for the personal computer 11 to be aware of the change of the data transfer apparatus. It is thus possible to change the data current transfer apparatus at a high speed without increasing a processing load of the personal computer 11.

The second embodiment shown in FIG. 4 has the same configuration, the same function and the same operations as the first embodiment. Thus, the second embodiment exhibits the same effects as the first embodiment.

In addition, except for addition of a buffer unit 245 to a control unit 24 as a configuration element, the configurations of the master 22 and the slave 23 are identical with the master 12 and the slave 13 in the first embodiment. Specifically, the configurations of an input buffer 241, an output buffer 244, a signal/data processing unit 242 and a storage medium 246, which are employed in the control unit 24, are identical with the master 12 and the slave 13 in the first embodiment. The configurations of a CRC receiving circuit 251, a CRC computing circuit 252, a coincidence detecting (error detecting) unit 253, a data comparing unit 254, a coincidence detecting unit 255, an error flag unit 256, an error information detecting unit 257, an error information accumulating unit 258 and a switching control unit 259, which are employed in an error verifying unit 25, are identical with the master 12 and the slave 13 in the first embodiment. Thus, the second embodiment executes the same operations and functions as the first embodiment. The second embodiment exhibits the same effects as the first embodiment.

In the first application example of transferring PIO data as shown by the flowchart shown in FIG. 7, if a command is received at S21 (S21: YES), and the command is the XDIOR/XDIOW signal (S22: YES), and if the command is a request for a retransmission (S24: YES), that is, a request for a retransmission is indicated by an error flag in the error flag unit 156, 256 or 356 found set. In this case, the control flow goes on to S25 to select an optimum slave based on information in the error information accumulating unit 158, 258 or 358. In actuality, there is only one slave 13, 23 or 33 in the first, second or third embodiment. As shown in FIG. 9, however, the fourth embodiment has a multi-slave configuration including the slaves 431 and 432 from which an optimum slave can be selected. At S26, the switching control unit 159, 259 or 359 outputs the PDIAG-signal conveying a command to change the current data transfer apparatus to the optimum slave. The processing of the control flow serves as a switching unit.

At S27, the data transfer apparatus has been confirmed, PIO data is transferred. At S28, it is determined whether the data transfer is a read operation. If the data transfer is a read operation (S28: YES), the slave 13, 23 or 33 transmits the PDIAG-signal representing information on an error to the error information detecting unit 157, 257 or 357. In the case of the fourth embodiment, the slaves 431 and 432 each transmit the PDIAG-signal representing information on an error. The information on an error transmitted by the slave 13, 23, 33, 431, or 432 is obtained as a result of comparison of data read out from the master 12, 22, 32 or 42 with the backup of the data stored in the slave 13, 23, 33, 431, or 432. At S29, If no error indicated by a data mismatch is determined to exist, the PDIAG-signal is asserted. If an error indicated by a data mismatch is determined to exist, on the other hand, the PDIAG-signal is negated. The processing of the control flow serves as an error information transferring unit. At S30, the error flag in the error flag unit 156, 256, 356 is examined to determine whether the error flag is set. If the error flag is set (S30: YES), the master 12, 22, 32 or 42 reports the error status to the personal computer 11, 21, 31 or 41. The reported error status represents information on an error detected in the master 12, 22, 32 or 42 itself and information on an error detected in the slaves 13, 23, 33 or 431, 432 (S31). The processing of the control flow serves as a notifying unit.

FIG. 8 is a diagram showing control flows of an UltraDMA transfer explained as a second application example. Much like the control flows shown in FIG. 7, if the command is the XDIOR/XDIOW signal (S41, S42: YES), if the command is a request for a read operation (S44: YES), if an error flag is found set at S45, indicating that the received command is a request for a retransmission, an optimum slave is selected (S46) and the current data transfer apparatus is changed (S47). When the data transfer apparatus has been confirmed (S48), the personal computer transfers data and CRC codes to the master (S49). At S50, the slave 13, 23 or 33 transmits the PDIAG-signal representing information on an error to the error information detecting unit 157, 257 or 357 employed in the master 12, 22 or 32. In the fourth embodiment, the slaves 431 and 432 each transmit the PDIAG-signal representing information on an error to the master 42. The information on an error transmitted by the slave 13, 23 or 33 is obtained as a result of comparison of data read out from the master 12, 22 or 32 with the backup of the data stored in the slave 13, 23 or 33. In the fourth embodiment, the pieces of information on an error transmitted by the slaves 431 and 432 are obtained as results of comparison of data read out from the master 42 with the backups of the data stored in the slaves 431 and 432. The information represents a result of comparison of the CRC codes received at S49 with CRC codes computed by the slaves 13, 23, 33 or 431, 432 for the backups of the data stored in the slaves 13, 23, 33 or 431. In addition, the information also indicates existence or nonexistence of an error detected by the CRC codes of data stored in the slave 13, 23, 33, 431 or 432 at an address specified at S49 after the data transfer apparatus has been changed to the slave 13, 23, 33, 431 or 432. If no error indicated by a data mismatch is determined to exist, the PDIAG-signal is asserted. If an error indicated by a data mismatch is determined to exist, the PDIAG-signal is negated. The processing of the control flow serves as an information transferring unit.

The master 12, 22, 32 or 42 receives information on an error for the data from the slaves 13, 23, 33 or 431, 432 and determines whether an error exists in the data based on the received information on an error and information on an error generated by the master 12, 22, 32 or 42 itself. At S51, the error flag in the error flag unit 156, 256, or 356 is examined to determine whether the error flag is set. If the error flag is set (S51: YES), the master 12, 22, 32 or 42 reports the error status to the personal computer 11, 21, 31 or 41. The reported error status represents information on an error detected in the master 12, 22, 32 or 42 itself and information on an error detected in the slaves 13, 23, 33 or 431, 432 (S52). The processing of the control flow serve as a notifying unit.

According to the configuration described above, in a transfer of data from the personal computer 11 to the master 12, the CRC receiving circuit 151 employed in the slave 13 takes in CRC codes. The coincidence detecting (error detecting) unit 153 serving as a part of the error verifying unit 15 can verify existence or nonexistence of an error based on the data and the fetched CRC codes. Thus, reliability of backup of the data stored in the slave 13 can be improved. It is possible to realize excellent data reliability in the backup system. In addition, since it is not necessary to transmit the data itself back to the personal computer 11 for verifying the data stored in the slave 13, the availability of the data processing system is improved.

Furthermore, when data and CRC codes are transferred from the master 12 to the personal computer 11, in the slave 13, the input buffer 141 takes in the data and the CRC receiving circuit 151 takes in the CRC codes. The data comparing unit 154 and the coincidence detecting unit 155 determine whether the fetched data matches the backup of the data already stored in the storage medium 146. As an alternative, the coincidence detecting (error detecting) unit 153 employed in the error verifying unit 15 verifies existence or nonexistence of an error based on the fetched CRC codes and the backup of the data already stored in the storage medium 146. Thus, it is possible to improve reliability of data transferred from the master 12 to the personal computer 11. Since data output by the master 12 can be compared with and verified against the backup of the data already stored in the slave 13 in a transfer of the data, improved reliability of data can be realized without reducing the availability of the data processing system.

In addition, the control line 1c is a line common to the personal computer 11, the master 12 and the slave 13. The IORDY-signal asserted on the control line 1C controls a transfer of PIO data. On the other hand, the IORDY-signal asserted on the control line 1C controls an UltraDMA transfer. Thus, transfers of data can be controlled to produce flows with no contention for the data bus 1D between the master 12 and the slave 13. It is possible to execute highly reliable control utilizing the responsive performance of each of the storage apparatus and the duplicating apparatus to its maximum while letting the apparatuses carry out operations without a contention for the data bus 1D between the master 12 and the slave 13, without generating a wasteful idle period and without causing an overflow and an underflow of data due to a difference in access speed and other attributes between the storage apparatus and the duplicating apparatus in execution of flow control.

Moreover, the PDIAG-signal asserted on the command line 1P conveys information representing a result of recognition of an error obtained in the slave 13 to the master 12. Such an error is recognized when data transferred to the master 12 is taken in by the slave 13 as a backup of the data or recognized as a result of typically comparison of data transferred from the slave 12 with the backup of the data already stored in the master 13. In this way, the master 12 can easily obtain a result of recognition of a data error in the slave 13. This capability contributes much to improvement of reliability of the backup system. In a transfer of data from the master 12 to the personal computer 11, the master 12 transfers the data to the personal computer 11 only after verifying that a result of comparison of the data with the backup of the data in the slave 13 indicates that the backup of the data stored in the slave 13 matches the data to be transferred. It is thus unnecessary for the slave 13 to transfer back the backup of the data to the personal computer 11. It therefore takes only a short time to obtain a result of recognition based on the backup of the data from the slave 13. It is possible to maintain high availability of the data processing system while assuring reliability of the backup of the data.

In addition, the master 12 can change the data transfer apparatus from the master 12 itself to the slave 13 after verifying that an error exists. The existence of an error is verified as a result of recognition of the error in the master 12 itself or indicated by the PDIAG-signal received from the slave 13 through the command line 1P as a result of comparison of the backup of data transferred from the master 12 with the data. Thus, correct data can be transferred without the need to carry out complex processing such control of changing the data transfer apparatus by the personal computer 11. It is possible to maintain high availability of the data processing system.

Moreover, the master 12 can report information on an error including a result of recognition of error existence in the slave 13 along with information on an error detected in the master 12 itself to the personal computer 11. Thus, the personal computer 11 can easily obtain information on existence or nonexistence of an error from the whole backup system including the slave 13. As a result, by obtaining a minimum possible amount of information on existence or nonexistence of an error in the storage and duplicating apparatuses, it is possible to assure reliability of data stored in the backup system including the master 12 and the slave 13 while maintaining high availability of the data processing system.

The second embodiment shown in FIG. 4 has the same configuration, the same function and the same operations as the first embodiment. Thus, the second embodiment exhibits the same effects as the first embodiment. The buffer unit 245 is arranged between the signal/data processing unit 242 and the storage medium 246 for storing data. The buffer unit 245 plays the role of adjusting differences in speed between processing to input and output data as well as processing to convert the format of data and internal processing. Even in the case of data input and output at a high speed, the differences in processing speed can be absorbed so that it is possible to implement smooth data transfer processing.

In the third embodiment (FIG. 5), a backup system has the same configuration as the first embodiment. Thus, the third embodiment executes the same operations and functions as the first embodiment, exhibits the same effects as the first embodiment. The components, which are employed in the error verifying unit 35 and the control unit 34, are implemented by pieces of software executed by a microprocessor 343. Thus, by modifying the pieces of software executed by the MPU 343, it is possible to provide a backup system capable of keeping up with variations in data-processing-system configuration with a high degree of flexibility.

In the fourth embodiment (FIG. 9), a backup system has a multi-slave configuration in which 2 slaves 431 and 432 are provided for one master 42. Thus, the fourth embodiment executes the same operations and functions as the first embodiment, and exhibits the same effects as the first embodiment. In addition, the master 42 can be designed into the same configuration as the masters 12, 22 and 32 whereas the slaves 431 and 432 can each be made identical with the slaves 13, 23 and 33. Thus, the fourth embodiment executes the same operations and functions as the first to third embodiments, and exhibits the same effects as the first to third embodiments. Command lines 4P1 and 4P2 connect the master 42 to the slaves 431 and 432. The command lines 4P1 and 4P2 are also used by the master 42 for transmitting a command to the slaves 431 and 432. The command switches the current data transfer apparatus from the master 42 to the slave 431 or 432. By providing each of the slaves 431 and 432 with an information accumulating unit having a function identical with the error information accumulating units 158, 258 and 358, it is possible to accumulate information on error-detection rates. Thus, it is possible to select a slave to serve as a backup apparatus optimum for a data type or an address based on this information and, hence, to implement a safe and highly reliable backup system, and the reliability of the data processing system can be improved.

It should be noted that the scope of the invention is not limited to the first to fourth embodiments. It is needless to say that a variety of improvements and changes within a range not departing from the true spirit of the invention can be made to the embodiments.

For example, the first to fourth embodiments use the CRC codes as an error checking code as described above. It is worth noting, however, that the error checking code is not limited to the CRC codes. Any code matching the required application of the data processing system can be used as far as the code is an error detection/correction code having a function to detect and/or correct an error.

In the multi-slave configuration adopted by the fourth embodiment, control lines for exchanging signals between the master and one of the slaves are provided separately from control lines provided between the master and the other slave. It is to be noted, however, that the multi-slave configuration is not limited to the fourth embodiment. It is needles to say that the multi-slave configuration can be designed into a topology wherein the control lines are put in a bus configuration, a daisy-chain configuration or any other configuration.

In the first to third embodiments, the backup system comprises 1 master and 1 slave while, in the fourth embodiment, the backup system comprises 1 master and 2 slaves as described above. It is should be noted, however, that the backup system of the invention is not limited to these configurations. For example, the backup system may comprise 2 or more masters and 2 or more slaves. Even in the case of such a multi-master and multi-slave configuration, by collecting information on errors such as error detection rates used for determining a slave optimum for each master in each error information accumulating unit, it is possible to implement a highly reliable backup system.

In a transfer of data between a host apparatus and a storage apparatus according to the invention, a duplicating apparatus takes in the data as well as codes at the same time as the transfer, and reports a result of verification of error existence or nonexistence in the data to the storage apparatus. Thus, the host apparatus can obtain a result of verification of error existence or nonexistence generated by the storage apparatus and a result of verification of error existence or nonexistence generated by the duplicating apparatus without the need for the duplicating apparatus to transmit back the backup of data to the host apparatus. It is possible to provide a backup system for a data processing system and a duplicating apparatus employed in the backup system which can improve reliability of data without sacrificing availability of the data processing system.

In addition, a control line connected to the host apparatus is a line common to both the storage and duplicating apparatuses. Thus, it is possible to execute flow control of transfers of data between the host apparatus and the storage and duplicating apparatuses without causing a contention for the data bus. Moreover, in execution of the flow control, there will be neither overflow nor underflow of data caused by a difference in access speed between the storage and duplicating apparatuses and other differences.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalent.

What is claimed is:

1. A backup system including a duplicating apparatus connected to a host apparatus and a storage apparatus via a common control line, the duplicating apparatus taking in data in a transfer of data and codes between a host apparatus and a storage apparatus and storing the data as duplicated data, the duplicating apparatus comprising:
    a code fetching unit to fetch the codes simultaneously in a transfer of the data and the codes between the host apparatus and the storage apparatus and storing the fetched codes as duplicated codes; and
    a data verifying unit to verify existence or nonexistence of an error in the data taken in based on the duplicated data and the fetched codes; and
    the backup system further comprising:
        an information transferring unit provided between the storage apparatus and the duplicating apparatus to transfer information on existence or nonexistence of an error generated by the data verifying unit to the storage apparatus.

2. A backup system according to claim 1, further comprising:
    an input/output control unit to control through the common control line so as to carry out an operation to transfer the data and the codes between the host apparatus and the storage apparatus in harmony with an operation to fetch the data or the codes into the duplicating apparatus.

3. A backup system according to claim 1, wherein the storage apparatus comprises:
    a data verifying unit to verify existence or nonexistence of an error in the data transferred between the host apparatus and the storage apparatus; and a notifying unit to notify existence or nonexistence of an error indicated by information on existence or nonexistence of an error generated by the data verifying unit employed in the storage apparatus and information received from the information transferring unit employed in the duplicating apparatus to the storage apparatus.

4. A backup system including a duplicating apparatus connected to a host apparatus and a storage apparatus via a common control line, the duplicating apparatus taking in data in a transfer of data and codes between the host apparatus and the storage apparatus and storing the data as duplicated data, the duplicating apparatus comprising:

a fetching unit to take in the codes simultaneously in a transfer of the data and the codes from the storage apparatus to the host apparatus; and at least one of the following units:
a data comparing unit to compare the data taken in by the fetching unit with the duplicated data; or
a data verifying unit to verify existence or nonexistence of an error in the data taken in based on the duplicated data and the fetched codes; and the backup system further comprising:
an information transferring unit provided between the storage apparatus and the duplicating apparatus to transfer at least information on existence or nonexistence of an error generated by the data verifying unit or a result of data comparison generated by the data comparing unit to the storage apparatus.

5. A backup system according to claim 4, wherein the storage apparatus comprises:
a data verifying unit to verify existence or nonexistence of an error in the data transferred from the storage apparatus to the host apparatus; and
a switching unit to replace a transfer of data from the storage apparatus to the host apparatus with a transfer of the duplicated data of the data from the duplicating apparatus to the host apparatus, when, in the transfer of the data from the storage apparatus to the host apparatus, an error is determined to exist in the data to be transferred from the storage apparatus to the host apparatus from at least information on existence or nonexistence of an error generated by the data verifying unit employed in the storage apparatus or the information received from the information transferring unit employed in the duplicating apparatus.

6. A backup system according to claim 4,
wherein there is provided a plurality of the duplicating apparatuses, and the storage apparatus further comprises:
an information accumulating unit to record and accumulate pieces of information received from the information transferring unit employed in each of the duplicating apparatuses; and
a switching control unit to control the switching unit so as to select a proper one among the duplicating apparatuses to read out the duplicated data based on information provided by the information accumulating unit in the event of a transfer error detected in data to be transferred from the storage apparatus to the host apparatus.

7. A backup system according to claim 4, the storage apparatus comprising:
a data verifying unit to verify existence or nonexistence of an error in the data transferred from the storage apparatus to the host apparatus; and a notifying unit to notify existence or nonexistence of an error indicated by information on existence or nonexistence of an error generated by the data verifying unit employed in the storage apparatus and information received from the information transferring unit employed in the duplicating apparatus to the storage apparatus.

8. A duplicating apparatus, connected to a host apparatus and a storage apparatus via a common control line, for taking in data in a transfer of data and codes between the host apparatus and the storage apparatus and storing the data as duplicated data, the duplicating apparatus comprising:

a code fetching unit to fetch the codes simultaneously in a transfer of the data and the codes between the host apparatus and the storage apparatus and to store the fetched codes as duplicated codes;

a data verifying unit to verify existence or nonexistence of an error in the data taken in based on the duplicated data and the fetched codes; and an information transferring unit connected to the storage apparatus to transfer information on existence or nonexistence of an error generated by the data verifying unit to the storage apparatus.

9. A duplicating apparatus according to claim 8,
wherein the duplicating apparatus is connected to the host apparatus by a common control line also to connect the storage apparatus to the host apparatus; and the duplicating apparatus further comprises an input/output control unit to control through the common control line so as to carry out an operation to transfer the data and the codes between the host apparatus and the storage apparatus in harmony with an operation to fetch the data or the codes into the duplicating apparatus.

10. A duplicating apparatus according to claim 8, wherein the storage apparatus has the same configuration as the duplicating apparatus.

11. A duplicating apparatus according to claim 10,
wherein the storage apparatus and the duplicating apparatus are connected to the common control line, the duplicating apparatus used as the storage apparatus further comprising:

a switching unit to replace a transfer of data from the duplicating apparatus used as the storage apparatus to the host apparatus with a transfer of duplicated data from another duplicating apparatus to the host apparatus, when, in the transfer of the data from the duplicating apparatus used as the storage apparatus to the host apparatus, an error is determined to exist in the data to be transferred from at least information on existence or nonexistence of an error generated by the data verifying unit employed in the duplicating apparatus used as the storage apparatus or the information received from the information transferring unit employed in the other duplicating apparatuses.

12. A duplicating apparatus according to claim 11, further comprising:
an information accumulating unit to record and accumulate pieces of information received from the information transferring units employed in the duplicating apparatuses; and
a switching control unit to control the switching unit so as to select one of the duplicating apparatuses to read out the duplicated data based on information provided by the information accumulating unit in the event of a transfer error detected in data to be transferred from the duplicating apparatus used as the storage apparatus to the host apparatus.

13. A duplicating apparatus according to claim 10, wherein the storage apparatus and the duplicating apparatus are connected to the common control line, the duplicating apparatus used as the storage apparatus further comprising:
   a notifying unit to notify existence or nonexistence of an error indicated by information on existence or nonexistence of an error generated by the data verifying unit employed in the duplicating apparatus used as the storage apparatus and information received via the information transferring unit employed in the duplicating apparatuses to the host apparatus.

14. A duplicating apparatus, connected to a host apparatus and a storage apparatus via a common control line, for taking in data in a transfer of data and codes between the host apparatus and the storage apparatus and storing the data as duplicated data, the duplicating apparatus comprising:
   a fetching unit to take in the data and the codes simultaneously in a transfer of the data and the codes from the storage apparatus to the host apparatus;
   an information transferring unit connected to the storage apparatus to transfer information on existence or nonexistence of an error generated by the data verifying unit to the storage apparatus; and
   at least one of the following units:
      a data comparing unit to compare the data taken in by the fetching unit with the duplicated data; or
      a data verifying unit to verify existence or nonexistence of an error in the data taken in based on the duplicated data and the fetched codes.

15. A duplicating apparatus according to claim 14, wherein the storage apparatus has the same configuration as the duplicating apparatus.

16. A duplicating apparatus according to claim 15, wherein the storage apparatus and the duplicating apparatus are connected to the common control line, the duplicating apparatus used as the storage apparatus further comprising:
   a switching unit to replace a transfer of data from the duplicating apparatus used as the storage apparatus to the host apparatus with a transfer of duplicated data from the other duplicating apparatus to the host apparatus, when, in the transfer of the data from the duplicating apparatus used as the storage apparatus to the host apparatus, an error is determined to exist in the data to be transferred from at least information on existence or nonexistence of an error generated by the data verifying unit employed in the duplicating apparatus used as the storage apparatus or the information received from the information transferring unit employed in the other duplicating apparatuses.

17. A duplicating apparatus according to claim 16, further comprising:
   an information accumulating unit to record and accumulate pieces of information received from the information transferring unit employed in the duplicating apparatuses; and
   a switching control unit to control the switching unit so as to select one of the duplicating apparatuses to read out the duplicated data based on information provided by the information accumulating unit in the event of a transfer error detected in data to be transferred from the duplicating apparatus used as the storage apparatus to the host apparatus.

18. A duplicating apparatus according to claim 15, wherein the storage apparatus and the duplicating apparatus are connected to the common control line, the duplicating apparatus used as the storage apparatus further comprising:
   a notifying unit to notify existence or nonexistence of an error indicated by information on existence or nonexistence of an error generated by the data verifying unit employed in the duplicating apparatus used as the storage apparatus and information received via the information transferring unit employed in the duplicating apparatuses to the host apparatus.

19. A backup method by a duplicating apparatus of taking in data in a transfer of data and codes between a host apparatus and a storage apparatus connected via a common control line, and storing the data as duplicated data, the method comprising:
   fetching the codes and storing fetched codes as duplicated codes simultaneously in a transfer of the data and the codes between the host apparatus and the storage apparatus;
   verifying existence or nonexistence of an error in the data taken in based on the duplicated data and the fetched codes; and
   transferring information on existence or nonexistence of an error generated by verifying to the storage apparatus.

20. A backup method by a duplicating apparatus for taking in data in the transfer of data and codes between a host apparatus and a storage apparatus connected via a common control line and storing the data as duplicated data, comprising:
   fetching the codes simultaneously in a transfer of the data and the codes from the storage apparatus to the host apparatus;
   at least one of:
      comparing the data taken in by fetching with the duplicated data; or
      verifying existence or nonexistence of an error in the data taken in based on the duplicated data and the fetched codes; and
   transferring at least information on existence or nonexistence of an error generated by verifying or by comparing to the storage apparatus.

21. A backup system including a plurality of duplicating apparatuses for taking in data in a transfer of data and codes from a host apparatus to a storage apparatus and storing the data as duplicated data, each duplicating apparatus comprising:
   a code fetching unit to fetch the codes and storing the fetched codes as duplicated codes;
   a data verifying unit to verify existence or nonexistence of an error in the data by comparing the taken data and the duplicated data; and
   an information transferring unit to transfer at least information on existence or nonexistence of an error generated by the data verifying unit or a result of data comparison generated by the data comparing unit to the storage apparatus, and
   wherein the storage apparatus comprises:
      an information accumulating unit to record and accumulate pieces of information received from the information transferring unit employed in each of the duplicating apparatuses; and
      a switching control unit to control the switching unit so as to select a proper one among the duplicating apparatuses to read out the duplicated data based on information provided by the information accumulating unit in the event of a transfer error detected in data to be transferred from the storage apparatus to the host apparatus.

22. A duplicating apparatus for taking in data in a transfer of data and codes between a host apparatus and a storage apparatus and storing the data as duplicated data, the duplicating apparatus comprising:
- a fetching unit to take in the data and the codes simultaneously in a transfer of the data and the codes from the storage apparatus to the host apparatus;
- a switching unit to replace a transfer of data from the duplicating apparatus to the host apparatus with a transfer of duplicated data of the data from the duplicating apparatus or the storage apparatus to the host apparatus, when, in the transfer of the data from the duplicating apparatus to the host apparatus, an error is determined to exist in the data to be transferred from the duplicating apparatus to the host apparatus from at least information on existence or nonexistence of an error generated by the data verifying unit employed in the duplicating apparatus or the information received from the information transferring unit employed in the other duplicating apparatus; and
- at least one of the following units:
- a data comparing unit to compare the data taken in by the fetching unit with the duplicated data; or
- a data verifying unit to verify existence or nonexistence of an error in the duplicated data by comparing the taken data and the duplicated data,
- wherein the storage apparatus has the same configuration as the duplicating apparatus.

23. A duplicating apparatus for taking in data in a transfer of data and codes from a host apparatus to a storage apparatus and storing the data as duplicated data, the duplicating apparatus comprising:
- a fetching unit to take in the data and the codes in a transfer of the data and the codes from the storage apparatus to the host apparatus;
- an information accumulating unit to record and accumulate pieces of information received from the information transferring unit employed in the duplicating apparatus or the storage apparatus;
- a switching control unit to control the switching unit so as to select two or more proper other duplicating apparatuses to read out the duplicated data based on information provided by the information accumulating unit in the event of a transfer error detected in data to be transferred from the duplicating apparatus to the host apparatus; and
- at least one of the following units:
- a data comparing unit to compare the data taken in by the fetching unit with the duplicated data; or
- a data verifying unit to verify existence or nonexistence of an error in the duplicated data by comparing the taken data and the duplicated data,
- wherein the storage apparatus has the same configuration as the duplicating apparatus.

24. A backup system including a duplicating apparatus connected to a host apparatus and a storage apparatus via a common control line, the duplicating apparatus taking in data in a transfer of data and codes between the host apparatus and the storage apparatus and storing the data as duplicated data,
the duplicating apparatus comprising:
- a fetching unit to take in the data and the codes in a transfer of the data and the codes from the storage apparatus to the host apparatus;
- at least one of the following units:
- a data comparing unit to compare the data taken in by the fetching unit with the duplicated data; or
- a data verifying unit to verify existence or nonexistence in the duplicated data by comparing the taken data and the duplicated data; and
- an information transferring unit to transfer at least information on existence or nonexistence of an error generated by the data verifying unit or a result of data comparison generated by the data comparing unit to the storage apparatus,
wherein there is provided a plurality of the duplicating apparatuses, and the storage apparatus comprises:
- an information accumulating unit to record and accumulate pieces of information received from the information transferring unit employed in each of the duplicating apparatuses; and
- a switching control unit to control the switching unit so as to select a proper one among the duplicating apparatuses to read out the duplicated data based on information provided by the information accumulating unit in the even of a transfer error detected in data to be transferred from the storage apparatus to the host apparatus.

25. A duplicating apparatus, connected to a host apparatus and a storage apparatus via a common control line, for taking in data in a transfer of data and codes between the host apparatus and the storage apparatus and storing the data as duplicated data, the duplicating apparatus comprising:
- a code fetching unit to fetch codes and to store the fetched codes as duplicated codes;
- a data verifying unit to verify existence or nonexistence of an error in the duplicated data by comparing the taken data and the duplicated data; and
- a switching unit to replace a transfer of data from the duplicating apparatus to the host apparatus with a transfer of duplicated data of the data from the duplicating apparatus to the host apparatus when, in the transfer of the data from the duplicating apparatus to the host apparatus, an error is determined to exist in the data to be transferred from the duplicating apparatus to the host apparatus from at least information on existence or nonexistence of an error generated by the data verifying unit employed in the duplicating apparatus or the information received from the information transferring unit employed in the duplicating apparatus,
wherein the storage apparatus has the same configuration as the duplicating apparatus.

* * * * *

UNITED STATES PATENT AND TRADEMARK OFFICE
CERTIFICATE OF CORRECTION

| | | |
|---|---|---|
| PATENT NO. | : 7,082,548 B2 | Page 1 of 1 |
| APPLICATION NO. | : 09/793539 | |
| DATED | : July 25, 2006 | |
| INVENTOR(S) | : Manabu Nakano | |

It is certified that error appears in the above-identified patent and that said Letters Patent is hereby corrected as shown below:

Col. 32, line 29, delete "even" and insert --event--, therefor.

Signed and Sealed this

Twenty-fourth Day of July, 2007

JON W. DUDAS
*Director of the United States Patent and Trademark Office*